US012756545B2

(12) United States Patent
Zhang et al.

(10) Patent No.: US 12,756,545 B2
(45) Date of Patent: Oct. 6, 2026

(54) MULTI-AXIS MEASUREMENT PROTOCOL TO PROTECT QUANTUM INFORMATION

(71) Applicant: ACCENTURE GLOBAL SOLUTIONS LIMITED, Dublin (IE)

(72) Inventors: Junyao Zhang, Durham, NC (US); Benjamin Glen Mccarty, Washington, DC (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 37 days.

(21) Appl. No.: 19/060,260

(22) Filed: Feb. 21, 2025

(65) Prior Publication Data

US 2026/0254622 A1 Aug. 27, 2026

(51) Int. Cl.
*H04L 29/06* (2006.01)
*H04L 9/08* (2006.01)

(52) U.S. Cl.
CPC .................................. *H04L 9/0852* (2013.01)

(58) Field of Classification Search
None
See application file for complete search history.

(56) References Cited

U.S. PATENT DOCUMENTS

| | | | | |
|---|---|---|---|---|
| 7,035,411 | B2 * | 4/2006 | Azuma | H04L 9/0852 380/263 |
| 11,170,318 | B2 * | 11/2021 | Ashrafi | G02F 3/00 |
| 11,387,993 | B2 * | 7/2022 | McCarty | G06N 10/00 |
| 11,516,190 | B1 * | 11/2022 | McCarty | H04L 9/0858 |
| 11,924,174 | B2 | 3/2024 | McCarty et al. | |
| 11,985,234 | B2 | 5/2024 | McCarty et al. | |
| 2016/0028542 | A1 * | 1/2016 | Choi | H04L 9/0858 380/28 |
| 2022/0083488 | A1 * | 3/2022 | Black | G06F 7/00 |
| 2024/0187344 | A1 * | 6/2024 | Griffin | G06N 10/00 |

* cited by examiner

*Primary Examiner* — Maung T Lwin
(74) *Attorney, Agent, or Firm* — Mannava & Kang, P.C.

(57) ABSTRACT

Systems and methods for implementing a multi-axis measurement protocol to protect quantum information are disclosed herein. A method includes generating at least one input qubit data for transmission. Further, the method includes determining one or more qubit measurement operations to be performed on the qubit data. The method then include generating one or more entangled pairs of qubits comprising first set of qubits and second set of qubits. Also, the method includes creating entangled data by entangling the input qubit data with the first set of qubits. The method then includes performing the determined at least one appropriate qubit measurement operation on the created entangled data to orientate a state of the created entangled data before transmission. Further, the method includes generating two classic bits for the created entangled data based on the performed appropriate qubit measurement operation and transmitting to the receiver via a classic communication channel.

20 Claims, 29 Drawing Sheets

MULTI-AXIS MEASUREMENT PROTOCOL TO PROTECT QUANTUM INFORMATION

TECHNICAL FIELD

Various embodiments described herein relate generally to system, method, and non-transitory computer readable medium for implementing a multi-axis measurement protocol to protect quantum information in the field of quantum information science, quantum computing, quantum communication, and quantum sensing.

BACKGROUND

Quantum computing relies on qubits (quantum bits), which are fundamental units of quantum information. Unlike classic bits, which can only represent a state of 0 or 1, qubits exist in a superposition of states, meaning they can represent both 0 and 1 simultaneously. This unique property, coupled with quantum entanglement and interference, allows quantum computers to potentially solve certain problems exponentially faster than classical computers.

One of the key challenges in the quantum computing is the measurement of qubits. While qubits exist in a superposition of states, measurement collapses them to one of basis states (0 or 1). This collapse process is inherently probabilistic, and the measurement outcome is random, but with probabilities defined by a quantum state before the measurement.

Existing technique of Z-axis basis, represented by $|0\rangle$ and $|1\rangle$, is a conventional standard for qubit measurement and classic bit encoding. However, the Z-axis basis technique poses a security challenge, as the technique may expose quantum algorithms, protocols, memory, and communication to potential interference, reverse engineering, interception, or attack by adversaries.

Generally, the foreknowledge of hybrid communication protocols (quantum teleportation and superdense coding) can potentially enable threat actors to manipulate the quantum algorithms, gaining unauthorized access to transmitted information, or altering qubit amplitudes and phases to their advantage. This poses significant risks to the confidentiality and integrity of secure information exchange facilitated by quantum protocols, algorithms, and systems. However, existing quantum encryption methods are not applicable to the hybrid protocols duo to a need for information transformation between qubits and classic bits. The existing quantum encryption techniques potentially corrupt since measuring a qubit may lose some of its features. Thus, it is imperative to develop unique cryptographic techniques to safeguard sensitive data over untrusted channels against potential attacks.

SUMMARY

In an aspect, the present disclosure relates to a system including a transmitter communicatively coupled to a processor, wherein the processor is configured to generate at least one input qubit data for transmission, wherein the at least one input qubit data includes a state of at least one qubit, determine at least one appropriate qubit measurement operation to be performed on the at least one input qubit data, wherein the at least one appropriate qubit measurement operation includes at least one orthogonal axis gate, wherein the at least one orthogonal axis gate includes at least one arbitrary measurement operation, generate at least one entangled pair of qubits includes at least one first set of qubits and at least one second set of qubits, wherein the at least one first set of qubits corresponds to the transmitter and the at least one second set of qubits correspond to a receiver, create at least one entangled data by entangling the at least one input qubit data with the at least one first set of qubits, perform the determined at least one appropriate qubit measurement operation on the created at least one entangled data to orientate a state of the created at least one entangled data before transmission, generate at least two classic bits for the created at least one entangled data based on the performed at least one appropriate qubit measurement operation, and transmit the at least two classic bits from the transmitter to the receiver via a classic communication channel.

In another aspect, the present disclosure relates to a method including generating, by a processor of a transmitter, at least one input qubit data for transmission, wherein the at least one input qubit data comprises a state of at least one qubit. Further, the method includes determining, by the processor of the transmitter, at least one appropriate qubit measurement operation to be performed on the at least one input qubit data, wherein the at least one appropriate qubit measurement operation comprises at least one orthogonal axis gate, wherein the at least one orthogonal axis gate comprises at least one arbitrary measurement operation. Furthermore, the method includes generating, by the processor of the transmitter, at least one entangled pair of qubits comprising at least one first set of qubits and at least one second set of qubits, wherein the at least one first set of qubits corresponds to the transmitter and the at least one second set of qubits corresponds to a receiver. Also, the method includes creating, by the processor of the transmitter, at least one entangled data by entangling the at least one input qubit data with the at least one first set of qubits. Further, the method includes performing, by the processor of the transmitter, the determined at least one appropriate qubit measurement operation on the created at least one entangled data to orientate a state of the created at least one entangled data before transmission. Moreover, the method includes generating, by the processor of the transmitter, at least two classic bits for the created at least one entangled data based on the performed at least one appropriate qubit measurement operation. Also, the method includes transmitting, by the processor of the transmitter, the at least two classic bits from the transmitter to the receiver via a classic communication channel.

In another aspect, the present disclosure relates to a non-transitory computer-readable medium including machine-executable instructions that may be executable by a processor to perform the method as discussed herein.

It is appreciated that method in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features of the present disclosure will be apparent from the description and drawings, and from the claims.

BRIEF DESCRIPTION OF THE FIGURES

Various implementations in accordance with the present disclosure will be described with reference to the drawings, in which.

Like reference numbers and designations in the various drawings indicate like elements.

DETAILED DESCRIPTION

Figure 1:
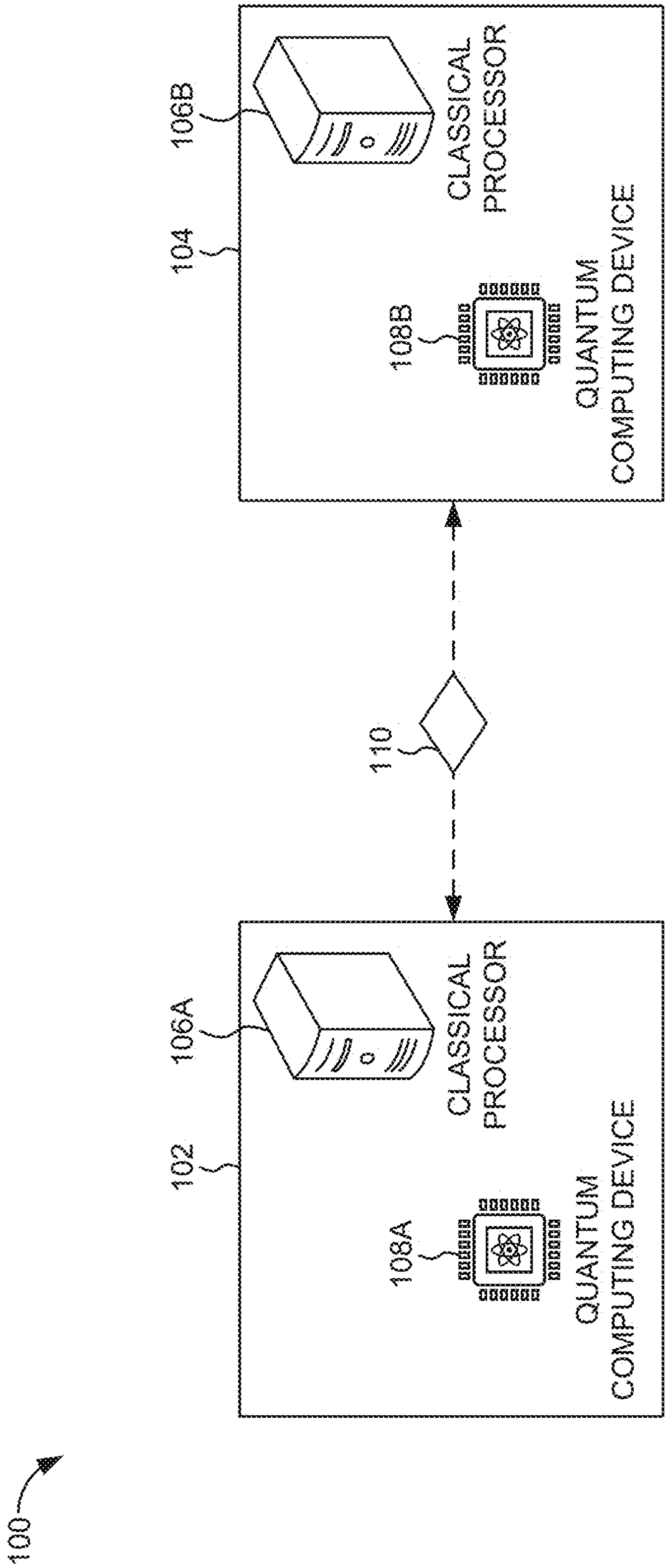
FIG. 1 depicts an example system that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example," "an example of" by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to;" it specifically indicates open-ended inclusion or membership in the so-described combination, group, series, and the like.

The term "a" means "one or more" unless the context clearly indicates a single element.

"First," "second," and/or the like., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, and/or the like).

It should be noted that terms "secret bit" and "classic bit" are used interchangeably throughout the document.

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the disclosure as set forth in the claims.

In quantum mechanics, there are three orthogonal bases (X, Y, and Z) for qubit measurement. For example, a qubit corresponds to a superconducting qubit, a trapped ion, a neutral atom qubit, a photonic qubit, a quantum dot, a topological qubit, an ion chain and/or an adiabatic qubit.

These diverse basis measurements (i.e., a multi-axis measurement protocol) play a crucial role in quantum teleportation, providing a robust defensive mechanism against potential adversaries. Implementations of the present disclosure use the multi-axis measurement protocol to enhance unpredictability, thus making the measurements significantly more challenging for an adversary to accurately predict the outcome.

Implementations of the present disclosure integrates multi-axis measurements and an anti-control logic as a concealed mechanism, while preserving an operational functionality of the quantum teleportation. In addition, the mechanism can be used to improve secrecy and mitigate tampering or attacks in a wide variety of applications and settings including quantum symmetry breaking algorithms, e.g., quantum superdense coding and quantum teleportation, quantum internet, quantum repeaters, and quantum routers. The quantum information can remain confidential and thus, integrity is protected. Accordingly, the confidentiality and integrity of quantum protocols, quantum algorithms or quantum systems that implements the multi-axis measurement protocol is improved.

Implementations of the present disclosure further fortify the quantum teleportation by replacing a standard control logic with the anti-control logic. Thus, the anti-control logic adds an extra layer of security, ensuring integrity and confidentiality of the quantum information.

In addition, the multi-axis measurement protocol may include quantum computing operations that can be chosen to be universal, elementary, e.g., including only single or two-qubit gates, and/or in a Clifford-group. Expensive operations, e.g., implementations of T gates may not be required. Implementations of the quantum computations required to implement the multi-axis measurement protocol can therefore be computationally stable, efficient and quantum hardware agnostic. Also, the presently described multi-axis measurement protocol may be compatible with known modalities of exchange interactions.

Further, by introducing additional gate operations, implementations of the present disclosure enhance the protocol's versatility and complexity, thereby bolstering the overall security capabilities of quantum teleportation.

FIG. 1 depicts an example system 100 that may be used to execute implementations of the present disclosure. In some examples, the example system 100 implements a multi-axis measurement protocol for protecting quantum information. As depicted in FIG. 1, the example system 100 includes a transmitter 102 associated with a first user and a receiver 104 associated with a second user. In this example, the transmitter 102 and receiver 104 may be communicatively coupled with each other using a classic communication channel 110. In some examples, the classic communication channel 110 may include, but is not limited to, a Local Area Network (LAN), a Wide Area Network (WAN), the Internet, or a combination thereof. In some other examples, the classic communication channel may be accessed over a wired and/or a wireless communication link.

In some examples, the transmitter 102 may include a classical processor 106A and a quantum computing device 108A. The classical processor 106A and the quantum computing device 108A may exchange electronic communications over one or more networks, or can exchange communications in another way, such as over one or more wired or wireless connections. The classical processor 106A may be a processor configured to perform classical computations. The quantum computing device 108A is configured to perform quantum computations. For convenience, the classical processor 106A and the quantum computing device 108A are illustrated as separate entities. However, in some implementations the classical processor 106A and the quantum computing device 108A can be included in the quantum computing device 108A. That is, the quantum computing device 108A can include components for performing classical computing operations. Generally, the classical computing components of the transmitter 102 can be implemented as one or more classical computers having physical hardware like that described with respect to FIG. 11 and the quantum computing components of the transmitter 102 can be implemented as quantum computing devices having physical hardware like that described with respect to FIG. 10.

In some examples, the receiver 104 may include a classical processor 106B a and a quantum computing device 108B. The classical processor 106B and the quantum computing device 108B may exchange electronic communications over one or more networks, or can exchange communications in another way, such as over one or more wired or wireless connections. The classical processor 106B may be configured to perform classical computations. The quantum computing device 108B is configured to perform quantum computations. For convenience, the classical processor 106B and the quantum computing device 108B are illustrated as separate entities. However, in some implementations the classical processor 106B and the quantum computing device 108B can be included in the quantum computing device 108B. That is, the quantum computing device 108B can include components for performing classical computing operations. Generally, the classical computing components of the receiver 104 can be implemented as one or more classical computers having physical hardware like that described with respect to FIG. 11 and the quantum computing components of the receiver 104 can be implemented as quantum computing devices having physical hardware like that described with respect to FIG. 10.

In an example implementation, when the first user initiates communication with the second user, the transmitter 102 establishes secure communication channels with the receiver 104 via the classic communication channel 110. In this example implementation, the transmitter 102 may perform specific measurements and/or rotations on each qubit or gate operations to orientate the quantum information before transmission. Further, the transmitter 102 may transmit qubits or classic bits through the classic communication channel 110. For example, Upon receiving the classic communication channel 110, the receiver 104 may send acknowledgement to the transmitter 102. Then, the transmitter 102 may communicate cypher of chosen measurement(s) secret(s) and control qubit operations to the receiver 104 over the classic communication channel 110. Furthermore, the receiver 104 performs appropriate decoding and quantum gate operations to get a correct orientation. Example operations performed by the transmitter 102 and the receiver 104 are described below with reference to FIGS. 2A to 8D.

Figure 2A:
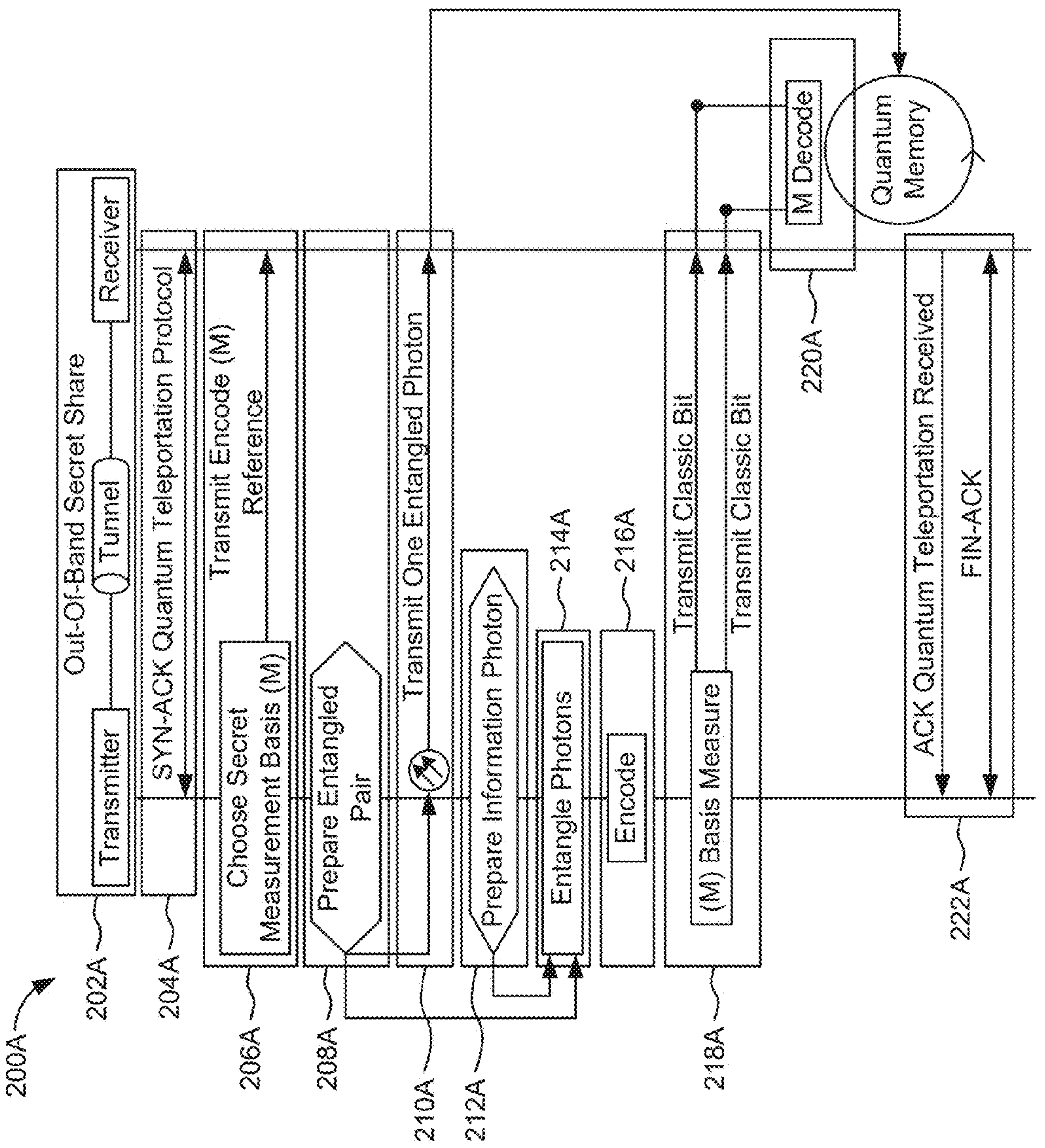
FIGS. 2A and 2B depict exemplary conceptual network sequences of a quantum teleportation protocol using multi-axis measurement and multi-axis (Y) measurement, respectively, in accordance with implementations of the present disclosure.
Figure 2B:
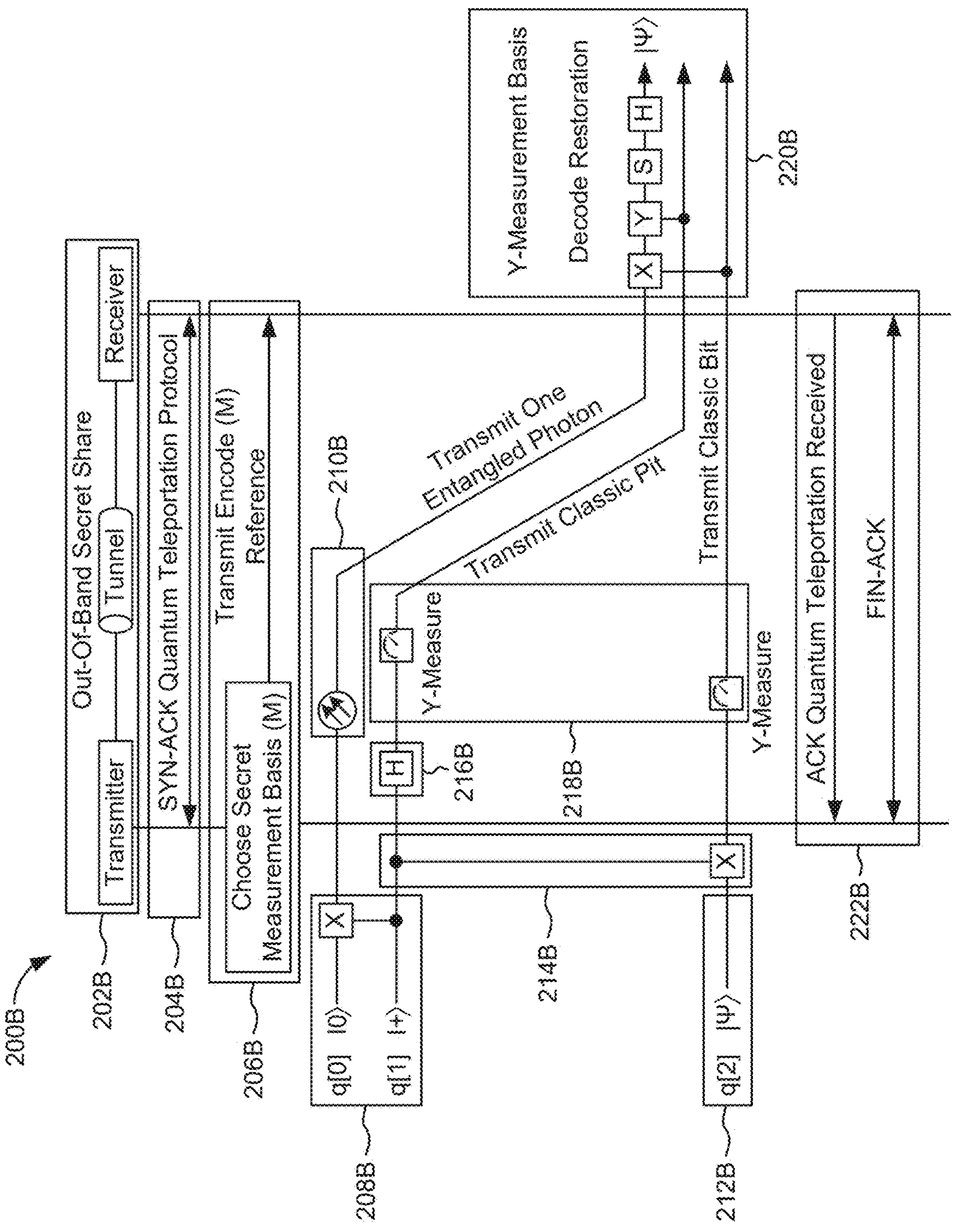

FIGS. 2A and 2B depict exemplary conceptual network sequences 200A and 200B of a quantum teleportation protocol using multi-axis measurement and multi-axis (Y) measurement, respectively, in accordance with implementations of the present disclosure. The exemplary conceptual network sequences 200A and 200B depict communication between a first user, Alice associated with the transmitter 102 and a second user, Bob associated with the receiver 104.

The first user may wish to establish a secure communication with the second user via the transmitter 102 and the receiver 104.

In the network sequence 200A, at step 202A, the transmitter 102 and the receiver 104 establish an encoded pre-shared secret for reference to the secret measurement basis in an Out-of-Band channel. At step 204A, the transmitter 102 and the receiver 104 synchronize and acknowledge a teleportation communication request over a classic communication channel. At step 206A, the transmitter 102 may transmit an encoded reference data associated with a chosen measurement basis(s) or a qubit measurement operation to the receiver 104 through an established out of band channel. The out of band channel can refer to a classical channel used for communicating certain information in tandem with quantum processes. The out of band channel can include a classical communication channel, an in-person meeting and the like. For example, the qubit measurement operation may include one or more orthogonal axis gates. In this example, the one or more orthogonal axis gates include an arbitrary measurement operation for measuring a quantum state. In some examples, the encoded reference data includes the appropriate qubit measurement operation and a control gate operation.

At block 208A, the transmitter 102 may prepare an entangled pair of qubit data for transmission. For example, the qubit data may include a state of one or more qubits. At step 210A, the transmitter 102 may transmit one entangled half to the receiver 104.

In an example implementation, the transmitter 102 may encode the control gate operation on the entangled qubit data to generate an inversed state of the entangled qubit data. Further, the transmitter 102 may transmit the encoded control gate operation within the encoded reference data to the receiver through the out of band channel established with the receiver 104.

At 212A, the transmitter 102 prepares information Qubit. At step 214A, the transmitter 102 entangles the prepared qubits with qubit data associated with the transmitter 102. At step 216A, the transmitter 102 may encode the entangled qubits for teleportation. For example, quantum information may be encoded in a quantum state vector of the one or more qubits. At step 218A, the transmitter 102 may measure qubits in the measurement basis or the qubit measurement operation secretly communicated to the receiver 104 in the step 206A and communicate bits classically to the receiver 104.

In an example implementation, the transmitter 102 determines a first qubit measurement operation to be performed on the qubit data. For example, the first qubit measurement operation may include a first orthogonal axis gate. In this example, the first orthogonal axis gate may include a first angle of rotation, a first axis, and a first global phase value. The angle of rotation may refer to a parameter used in certain quantum gates to rotate a state of a qubit on a Bloch sphere. The global phase value may refer to a phase factor that is applied uniformly to all components of a quantum state, without affecting physical properties or outcomes of quantum measurements. The axis may refer to directions along which a quantum gate operates when performing rotations on a qubit's state.

Further, the transmitter 102 may determine a second qubit measurement operation to be performed on the qubit associated with the transmitter. The second qubit measurement operation may include a second orthogonal axis gate. For example, the second orthogonal axis gate may include a second angle of rotation, a second axis, and a second global phase value. Also, the transmitter 102 performs the first qubit measurement operation on the qubit data and the second qubit measurement operation on the first set of qubits.

At step 220A, the receiver 104 may complete teleportation protocol decoding based on the measurement basis in the step 206A. In an example implementation, the receiver 104 identifies the qubit measurement operation, and the control gate operation performed on the entangled data, based on the received at least two classic bits and the received at least one encoded reference data. Further, the receiver 104 determines the state of the qubit based on the qubit measurement operation and the control gate operation. Furthermore, the receiver 104 performs the measurement operation on the received entangled data based on the determined state. Moreover, the receiver 104 performs identical control gate operations on the entangled data to obtain an original state of the entangled data. Also, the receiver 104 reconstructs the qubit based on the performed measurement operation and the control gate operation.

At step 222A, the transmitter 102 and the receiver 104 may acknowledge completion of the quantum teleportation protocol over the classic communication channel and close the communication.

[In the network sequence 200B, at step 202B, the transmitter 102 and the receiver 104 establish an encoded pre-shared secret for reference to the secret measurement basis in an Out-of-Band channel. At step 204B, the transmitter 102 and the receiver 104 synchronize and acknowledge a teleportation communication request over a classic communication channel. At step 206B, the transmitter 102 transmits an encoded (reference associated with a chosen measurement basis(s) (i.e., Y-axis) to the Bob. At block 208B, the transmitter 102 prepares an entangled pair.

At step 210B, the transmitter 102 transmits one entangled half (q[0]) to the Bob. At 212B, the transmitter 102 prepares information Qubit (q[2]). At step 214B, the transmitter 102 entangles Qubits q[1] and q[2]. At step 216B, the transmitter 102 encodes the q[1] for teleportation. In some examples, the transmitter 102 may encode the qubit data using a plurality of encryption techniques upon the creation of the entangled qubits or data.

At step 218B, the transmitter 102 measures the q[1] and q[2] in the Y-axis measurement basis secretly communicated to the receiver 104 in the step 206A and communicates bits classically to the receiver 104. At step 220B, the receiver 104 completes teleportation protocol decoding based on the measurement basis in the step 206B. At step 222B, the transmitter 102 and the receiver 104 acknowledge completion of the quantum teleportation protocol over a classic communication channel and close the communication.

Figure 3A:
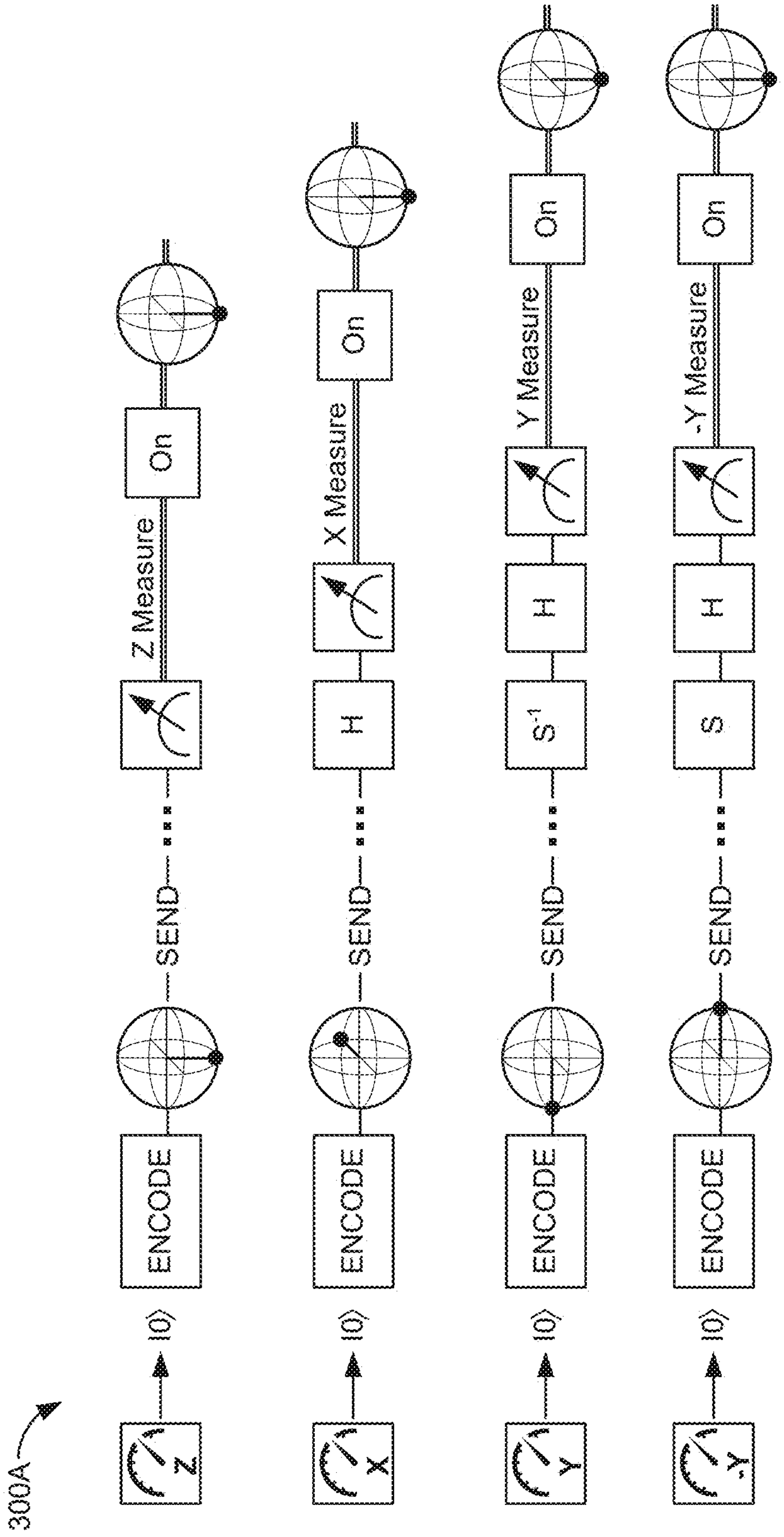
FIG. 3A depicts different axis measurement protocols, in accordance with implementations of the present disclosure.
Figure 3B:
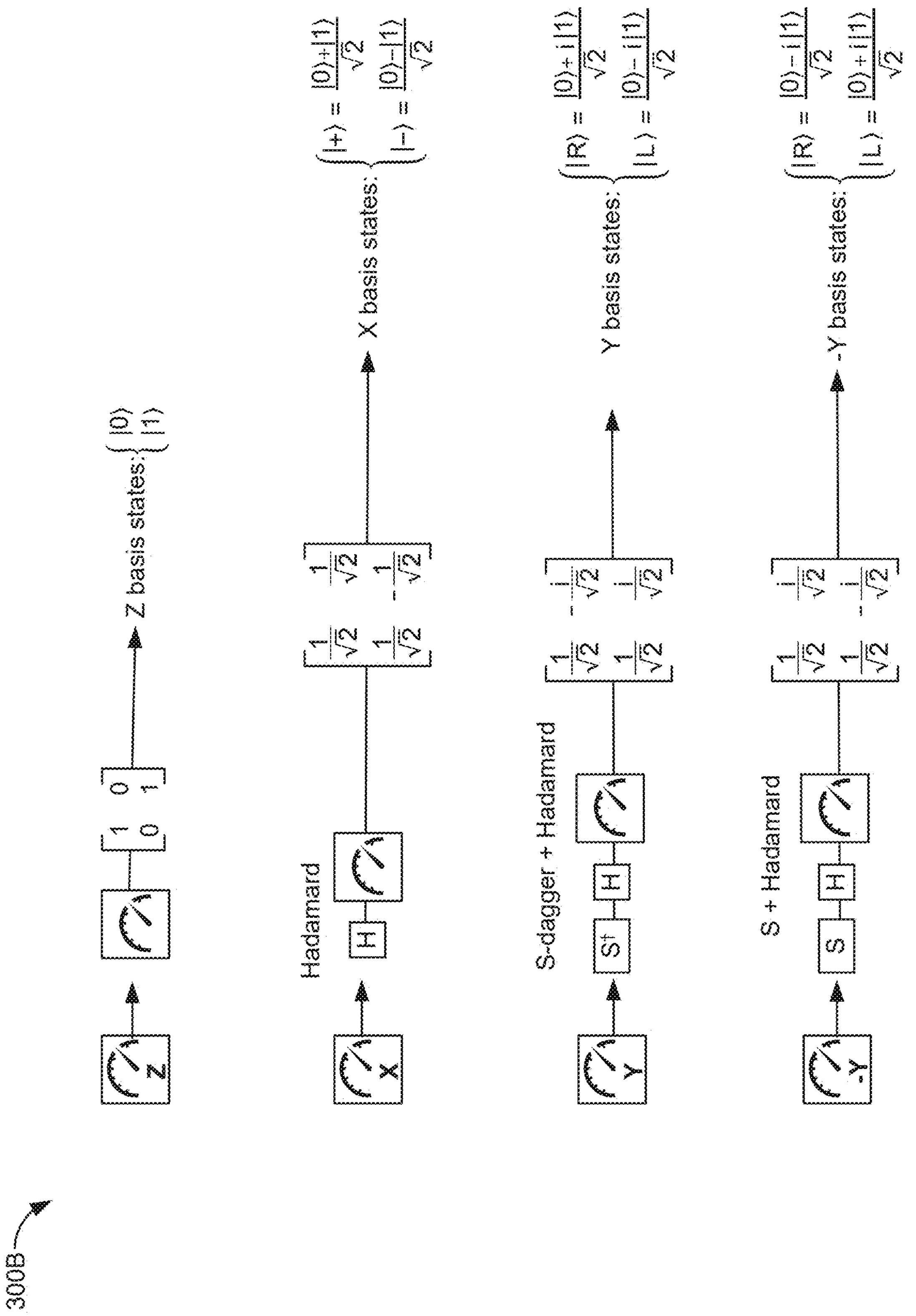
FIG. 3B depicts the different axis measurement protocols and respective states, in accordance with implementations of the present disclosure.

For example, if the transmitter 102 wants to send a state $|1\rangle$ to the receiver 104, a diagram 300A of FIG. 3A depicts different axis measurement protocols, in accordance with the present subject matter. Further, a diagram 300B of FIG. 3B depicts examples with the different axis measurement protocols and respective states, in accordance with the present subject matter.

Figure 4A:
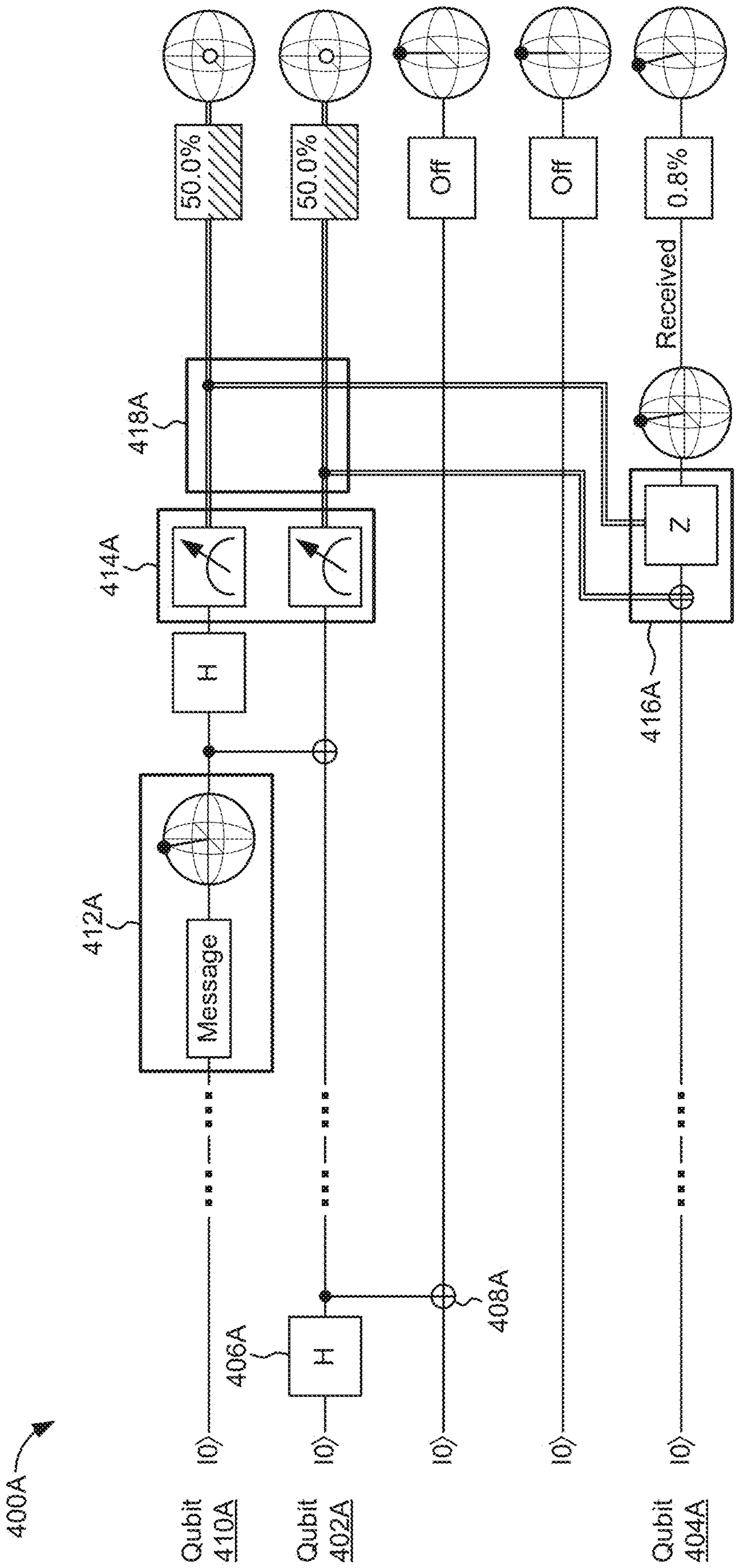
FIGS. 4A-4D depict exemplary quantum teleportation circuit diagrams, in accordance with implementations of the present disclosure.

FIGS. 4A-4D depict exemplary quantum teleportation circuit diagrams 400A-400D, in accordance with implementations of the present disclosure. For example, FIG. 4A depicts exemplary a z-axis quantum teleportation circuit diagram 400A, in accordance with implementations of the present disclosure. In some examples, quantum teleportation enables the transfer of a qubit's state from one location to another location, utilizing two classic communication bits and a shared bell pair. For example, the bell pair may be specific quantum states of two qubits that represent simplest examples of quantum entanglement. Essentially, a protocol annihilates a qubit's quantum state in one location and resurrects the qubit at a distant location, facilitated by shared entanglement.

In the circuit diagram 400A shown in FIG. 4A, the transmitter 102 may prepare two qubits 402A and 404A in an entangled quantum state (i.e., a Bell state) using a Hadamard gate 406A and a controlled NOT (CNOT) operation 408A. The transmitter 102 may then send the qubit 404A to the receiver 104. Also, the transmitter 102 may prepare a qubit 410A with secret information 412A and entangles the qubit 410A down into the qubit 402A using additional quantum operations. The transmitter may measure the qubits 402A and 410A in Z-axis measurement basis 414A and send classical measurement results including classic bits to the receiver 104.

In some examples, the receiver 104 may receive classical information and return the classical information to the qubit 404A through application of a CNOT gate, where two classic bits acts as controls for a restoration operation 416A including the CNOT operation and a control-Z gate. On this example, another classic bit acts as a control 418A for the Pauli-Z gate. Based on the state of the classic bits, the receiver 104 applies specific restoration operation 416A to the qubit 404A (i.e., receiver's half of the Bell pair), culminating in the teleportation of the information in the qubit 410A to the receiver 104.

In some examples, Alice wants to transmit a secret qubit, secret $|S\rangle$, to Bob. For example, the secret $|S\rangle$ can be defined as:

$$|\text{Secret}\rangle = \begin{bmatrix}\alpha\\ \beta\end{bmatrix} = \alpha|0\rangle + \beta|1\rangle$$

Further, the Alice and Bob share a bell pair (i.e., an entangled pair), which means each of Alice and Bob possess one qubit of the entangled pair.

$$\text{Bell}\rangle = \frac{\sqrt{2}}{2}|0\rangle_A|0\rangle_B + |1\rangle_A|1\rangle_B$$

Thus, a three-qubit quantum system is created where the Alice holds the first two qubits (from left side) and the Bob holds the last one.

$$|\text{Secret}\rangle \otimes |\text{Bell}\rangle = \frac{\sqrt{2}}{2}(\alpha|0\rangle + \beta|1\rangle) \otimes (|00\rangle + |11\rangle) = \frac{\sqrt{2}}{2}(\alpha|000\rangle + \alpha|011\rangle + \beta|100\rangle + \beta|111\rangle)$$

As the Alice entangles the secret qubit with her half of the Bell pair based on the protocol, then output state can be as follows:

$$(H \otimes I \otimes I)(CNOT \otimes I)|\text{Secret}\rangle \otimes |\text{Bell}\rangle =$$

$$(H \otimes I \otimes I)\frac{\sqrt{2}}{2}(\alpha|000\rangle + \alpha|011\rangle + \beta|110\rangle + \beta|101\rangle) =$$

$$\frac{1}{2}[\alpha(|000\rangle + |011\rangle + |100\rangle + |111\rangle) + \beta(|010\rangle + |001\rangle - |110\rangle - |101\rangle)]$$

Further, the states can be grouped as:

$$\begin{aligned} == \frac{1}{2}(&|00\rangle(\alpha|0\rangle + \beta|1\rangle) \\ &+|01\rangle(\alpha|1\rangle + \beta|0\rangle) \\ &+|10\rangle(\alpha|0\rangle - \beta|1\rangle) \\ &+|11\rangle(\alpha|1\rangle - \beta|0\rangle)) \end{aligned}$$

According the quantum teleportation process, the Alice needs to measure associated qubits (first two qubits) and send the qubits as classic qubits to the Bob. The measurement result that the Alice obtains is always one of the four standard basis state $|00\rangle$, $|01\rangle$, $|10\rangle$, $|11\rangle$. Then Bob's state may be projected to:

$$|00\rangle \rightarrow (\alpha|0\rangle + \beta|1\rangle)$$

$$|01\rangle \rightarrow (\beta|0\rangle + \alpha|1\rangle)$$

$$|10\rangle \rightarrow (\alpha|0\rangle - \beta|1\rangle)$$

$$|11\rangle \rightarrow (-\beta|0\rangle + \alpha|1\rangle)$$

According to the received classic bits from the Alice, the Bob knows that the secret qubit $|S\rangle = \alpha|0\rangle + \beta|1\rangle$ can be obtained by applying appropriate transformations on the Bob's qubit that is once part of the entangled pair. The transformations needs to apply are:

| Bob's State | Bits from Alice | Operation |
|---|---|---|
| $\alpha|0\rangle + \beta|1\rangle$ | 00 | I |
| $\beta|0\rangle + \alpha|1\rangle$ | 01 | X |
| $\alpha|0\rangle - \beta|1\rangle$ | 10 | Z |
| $-\beta|0\rangle + \alpha|1\rangle$ | 11 | ZX |

After the transformation, the Bob may successfully reconstructed Alice's qubit.

Figure 4B:
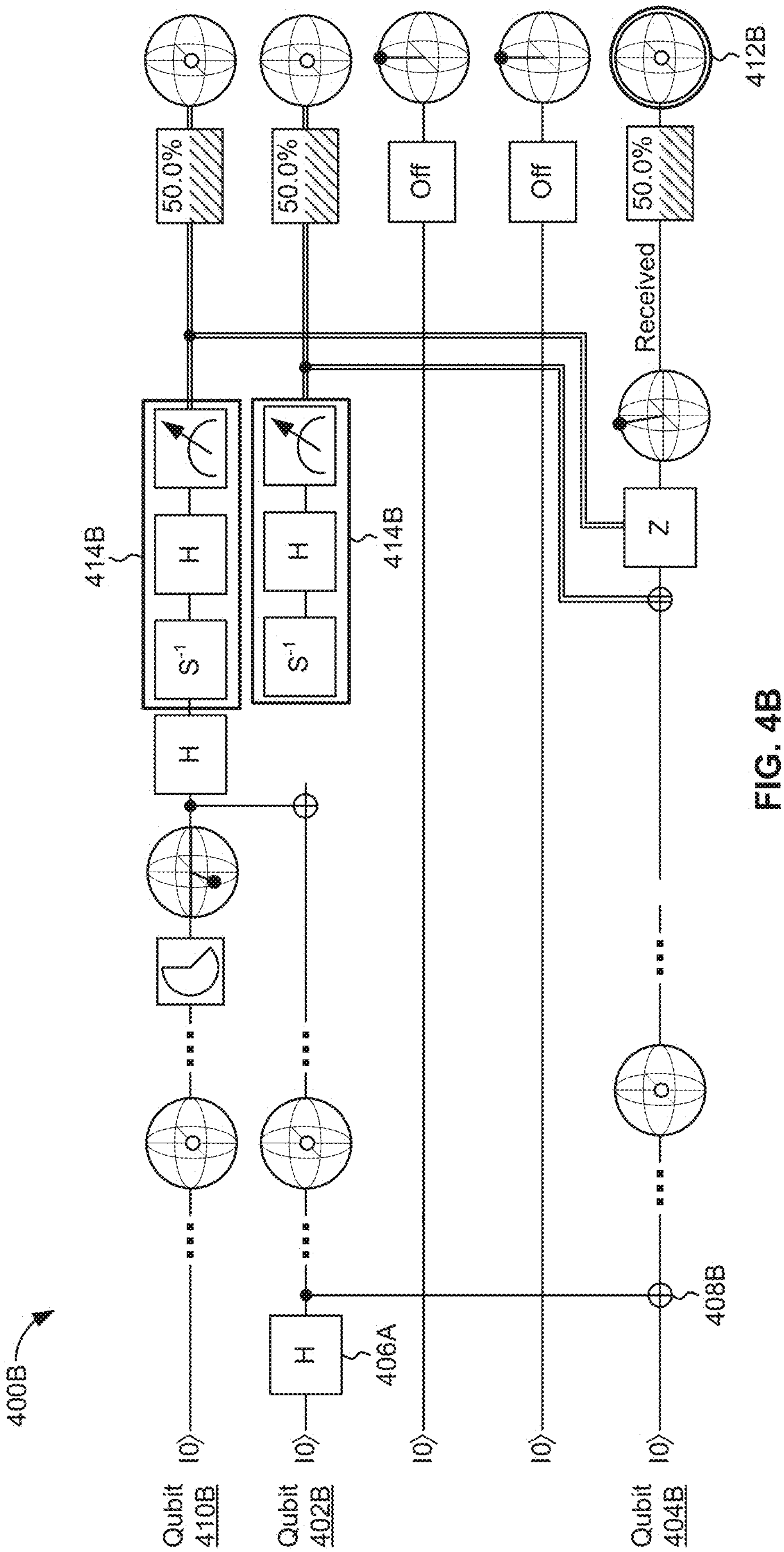

FIG. 4B depicts exemplary a Y-axis enhanced quantum teleportation circuit diagram 400B, in accordance with implementations of the present disclosure. In the circuit diagram 400B, the transmitter 102 prepares two qubits 402B and 404B in an entangled quantum state (i.e., a Bell state) using a Hadamard gate 406B and a controlled NOT (CNOT) operation 408B. Also, the transmitter 102 may prepare a qubit 410B with secret information 412B and entangles the qubit 410B down into the qubit 402B using additional quantum operations. The transmitter may measure the qubits 402B and 410B in Y-axis measurement basis 414B. The transmitter 102 may then send the qubit 404B and classical measurement results to the receiver 104.

During transmission, an eavesdropper device (not shown in Figures) may intercept the transmission and performs quantum operations to obtain the secret information in the qubit 410B that the transmitter 102 encoded in the qubit 402B. Since the eavesdropper device is not included in authorized parties who agreed, in advance, to use the secret information, the eavesdropper device does not know that a secret superposition quantum gate is used to prepare the entangled quantum state of the qubits 402B and 410B. Therefore, the eavesdropper device measures the qubits 402B and 410B using a Z-axis basis measurement protocol to obtain two classic bits of information. The eavesdropper device then obtains a corrupted qubit 412B as the eavesdropper device used incorrect measurement protocol.

Figure 4C:
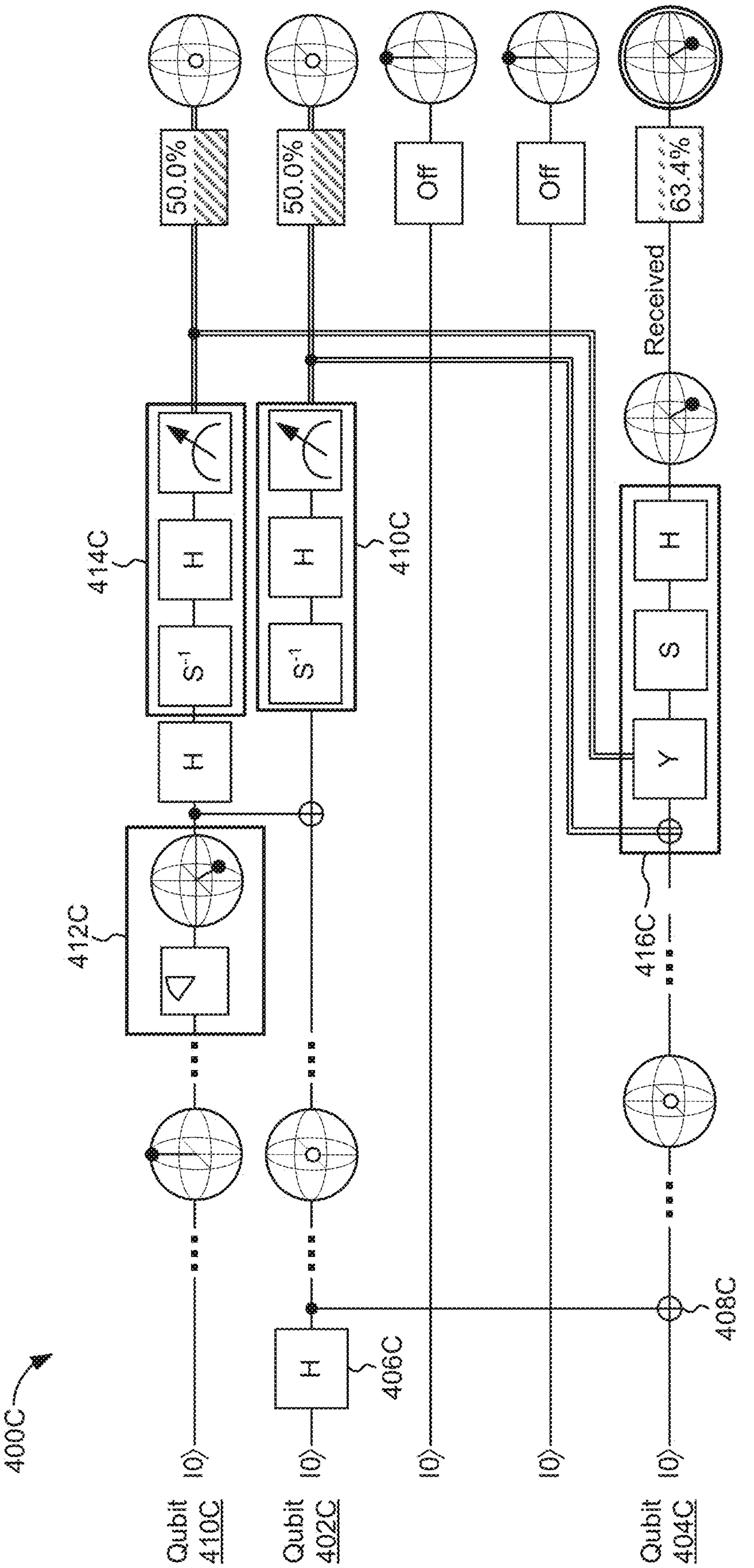

FIG. 4C depicts exemplary a Y-axis enhanced quantum teleportation circuit diagram 400C, in accordance with implementations of the present disclosure. In the circuit diagram 400C, the transmitter 102 prepares two qubits 402C and 404C in an entangled quantum state (i.e., a Bell state) using a Hadamard gate 406C and a controlled NOT (CNOT) operation 408C. The transmitter 102 may then send the qubit 404C to the receiver 104. Also, the transmitter 102 may prepare a qubit 410C with secret information 412C and entangles the qubit 410C down into the qubit 402C using additional quantum operations. The transmitter may measure the qubits 402C and 410C in Y-axis measurement basis 414C and send classical measurement results including classic bits to the receiver 104.

In some examples, the receiver 104 may receive classical information where one classic bit acts as a control for a restoration operation 416C. On this example, another classic bit acts as a control for the Y-axis measurement. Based on the state of the classic bits, the receiver 104 applies specific restoration operation 416C to the qubit 404C (i.e., receiver's half of the Bell pair), culminating in the teleportation of the information in the qubit 410C (i.e., correct secret qubit) to the receiver 104.

For example, an output state of the circuit diagram 400C may be $$(H \otimes H \otimes I)(S^{+} \otimes S^{+} \otimes I)(H \otimes I \otimes I)(CNOT \otimes I)(|\text{Secret}\rangle \otimes |\text{Bell}\rangle) =$$

$$(H \otimes H \otimes I)(S^{+} \otimes S^{+} \otimes I)(H \otimes I \otimes I)(CNOT \otimes I)\frac{\sqrt{2}}{2}(\alpha|000\rangle + \alpha|011\rangle +$$

$$\beta|110\rangle + \beta|101\rangle) = \frac{1-i}{4}((\alpha+\beta)|000\rangle - i(\alpha+\beta)|001\rangle + (\alpha-\beta)|010\rangle +$$

$$i(\alpha+\beta)|011\rangle + i(\alpha-\beta)|100\rangle + (\alpha+\beta)|101\rangle i(\alpha+\beta)|110\rangle - (\alpha-\beta)|111\rangle)$$

Further, in this example, states of the qubits can be grouped as:

$$= \frac{1-i}{4}(|00\rangle((\alpha+\beta)|0\rangle - i(\alpha+\beta)|1\rangle)$$

$$+|01\rangle((\alpha-\beta)|0\rangle + i(\alpha+\beta)|1\rangle)$$

$$+|10\rangle(i(\alpha-\beta)|0\rangle + (\alpha+\beta)|1\rangle)$$

$$+|11\rangle(i(\alpha+\beta)|0\rangle - (\alpha-\beta)|1\rangle))$$

Also, the restoration operations or transformations that are applied may include:

| Bob's State | Bits from Alice | Operation |
|---|---|---|
| $(\alpha + \beta)\ |0\rangle - i\ (\alpha + \beta)|1\rangle$ | 00 | HS |
| $(\alpha - \beta)\ |0\rangle + i\ (\alpha + \beta)|1\rangle$ | 01 | HSY |
| $i(\alpha - \beta)\ |0\rangle + (\alpha + \beta)|1\rangle$ | 10 | HSX |
| $i(\alpha + \beta)\ |0\rangle - (\alpha - \beta)|1\rangle)$ | 11 | HSYX |

Figure 4D:
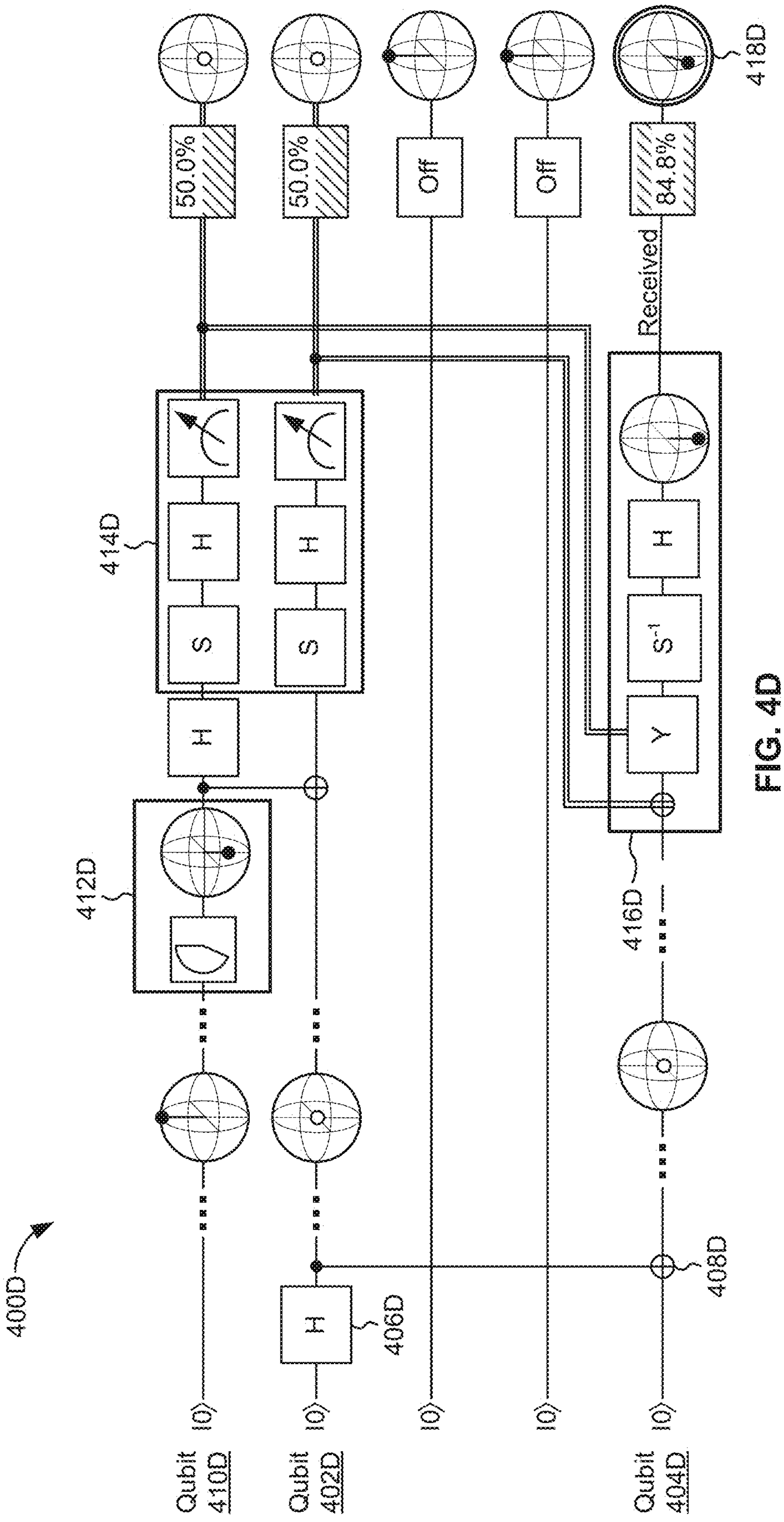

FIG. 4D depicts exemplary a −Y-axis enhanced quantum teleportation circuit diagram 400D, in accordance with implementations of the present disclosure. In the circuit diagram 400D, the transmitter 102 prepares two qubits 402D and 404D in an entangled quantum state (i.e., a Bell state) using a Hadamard gate 406D and a controlled NOT (CNOT) operation 408D. The transmitter 102 may then send the qubit 404D to the receiver 104. Also, the transmitter 102 may prepare a qubit 410D with secret information 412D and entangles the qubit 410D down into the qubit 402D using additional quantum operations. The transmitter 102 may measure the qubits 402D and 410D in −Y-axis measurement basis 414D and send classical measurement results including classic bits to the receiver 104.

In some examples, the receiver 104 may receive classical information where one classic bit acts as a control for a restoration operation 416D. On this example, another classic bit acts as a control for the −Y-axis measurement basis. Based on the state of the classic bits, the receiver 104 applies specific restoration operation 416D to the qubit 404D (i.e., receiver's half of the Bell pair), culminating in the teleportation of information in a qubit 418D (i.e., correct secret qubit 410D) to the receiver 104.

For example, an output state of the circuit diagrams 400D may include $$(H \otimes H \otimes I)(S \otimes S \otimes I)(H \otimes I \otimes I)(CNOT \otimes I)(|\text{Secret}\rangle \otimes |\text{Bell}\rangle)$$

$$= \frac{1+i}{4}(|00\rangle((\alpha+\beta)|0\rangle + i(a-\beta)|1\rangle)$$

$$+|01\rangle((\alpha-\beta)|0\rangle - i(\alpha+\beta)|1\rangle)$$

$$+|10\rangle(i(\alpha+\beta)|0\rangle + (\alpha+\beta)|1\rangle)$$

$$-|11\rangle(i(\alpha+\beta)|0\rangle - (\alpha-\beta)|1\rangle))$$

In this example, the specific restoration operation 416D or transformations applied may include:

| Bob's State | Bits from Alice | Operation |
|---|---|---|
| $(\alpha + \beta)\ |0\rangle - i\ (\alpha + \beta)|1\rangle$ | 00 | $H\ S^{+}$ |
| $(\alpha - \beta)\ |0\rangle + i\ (\alpha + \beta)|1\rangle$ | 01 | $H\ S^{+}Y$ |
| $i(\alpha - \beta)\ |0\rangle + (\alpha + \beta)|1\rangle$ | 10 | $H\ S^{+}X$ |
| $i(\alpha + \beta)\ |0\rangle - (\alpha - \beta)|1\rangle)$ | 11 | $H\ S^{+}YX$ |

Figure 5A:
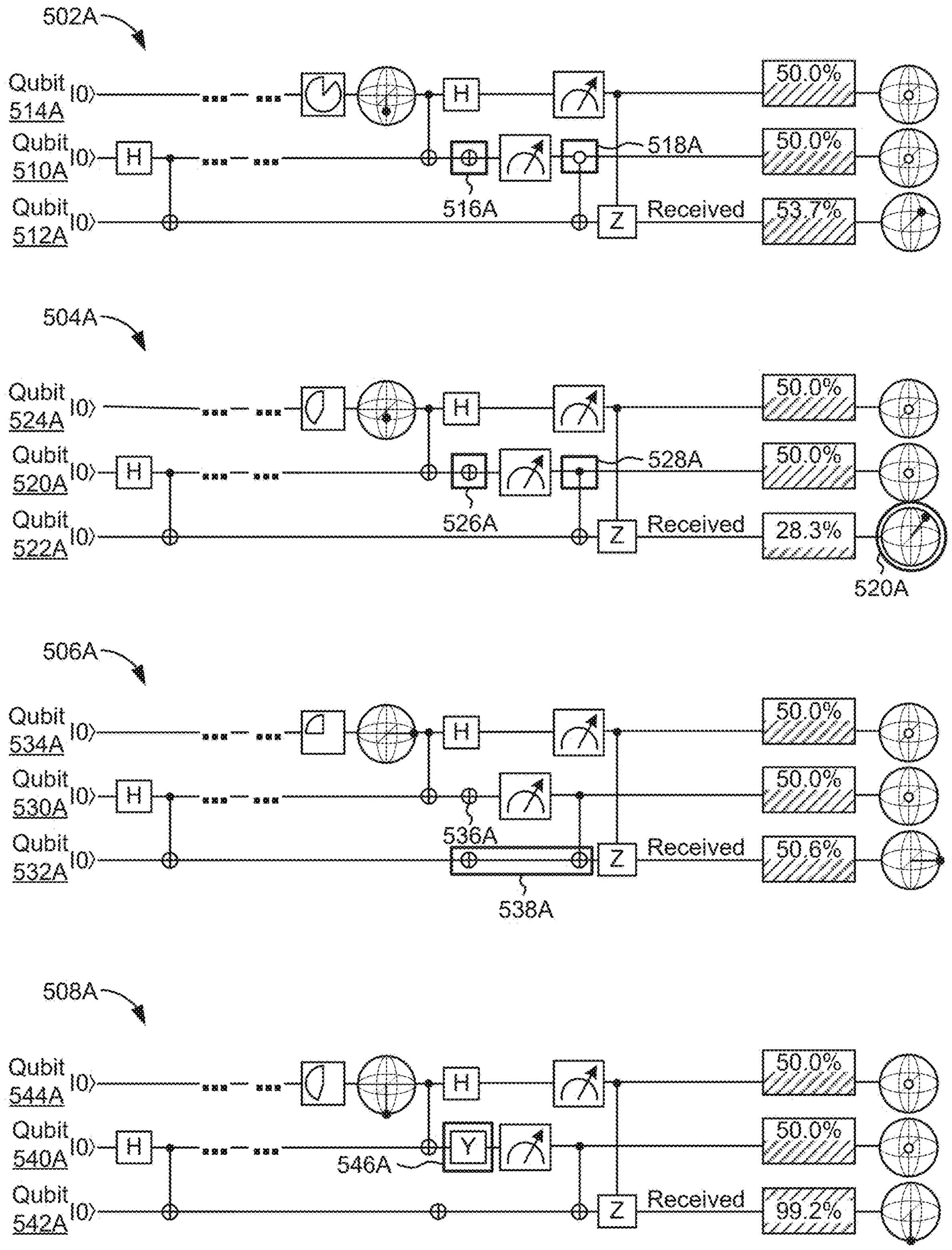
FIGS. 5A-5C depict exemplary anti-control quantum teleportation circuit diagrams, in accordance with implementations of the present disclosure.
Figure 5B:
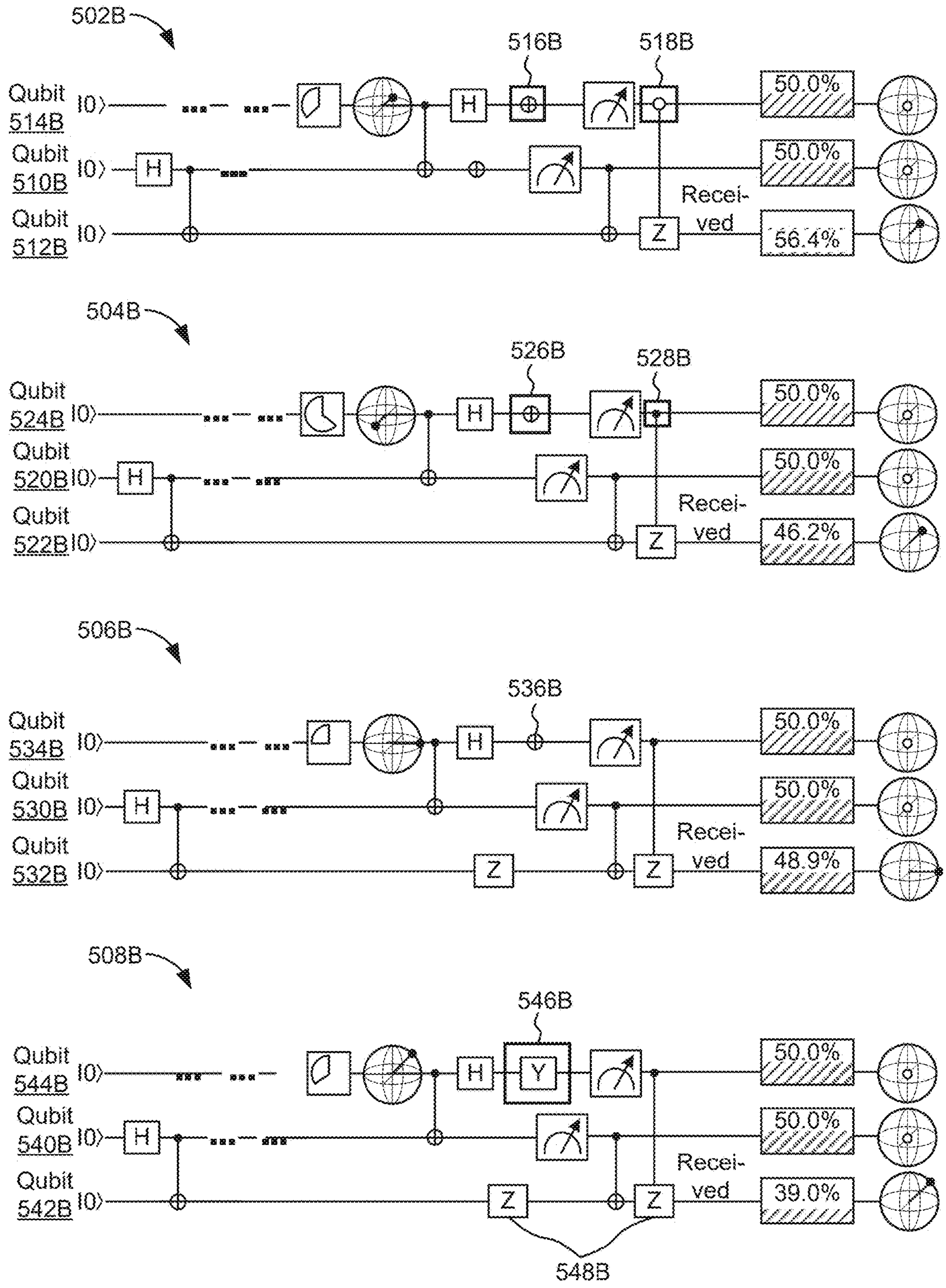
Figure 5C:
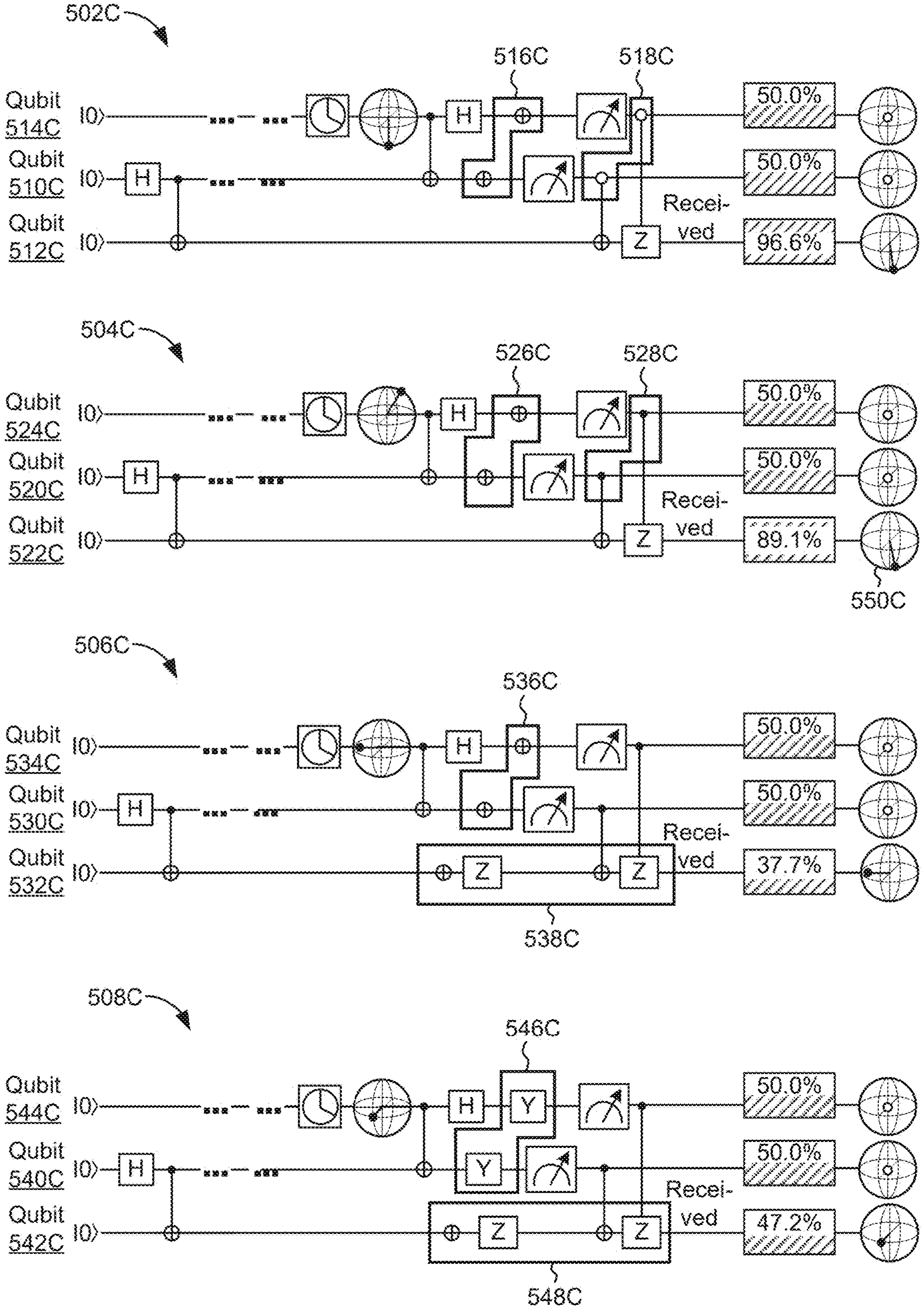

FIGS. 5A-5C depict exemplary anti-control quantum teleportation circuit diagrams 500A-500C, in accordance with implementations of the present disclosure. In some examples, the circuit diagrams 500A-500C reveal that the transmitter 102 may perform qubit measurement on a secret basis and may conduct anti-control operations (communicated to the receiver 104 through the out of band channel), providing an added layer of security against potential interceptions by a third party (e.g., the eavesdropper device). Also, the circuit diagrams 500A-500C illustrate multiple ways of encoding secret information with anti-control operations. Any assumption of a standard Z measurement by the eavesdropper device may result in an incorrect teleportation of the information.

In some examples, in the circuit diagram 502A shown in FIG. 5A, the transmitter 102 may prepare two qubits 510A and 512A in an entangled quantum state (i.e., a Bell state) using a Hadamard gate and a controlled NOT (CNOT) operation. The transmitter 102 may then send the qubit 512A to the receiver 104. Also, the transmitter 102 may prepare a qubit 514A with secret information and entangles the qubit 514A down into the qubit 510A using additional quantum operations. The transmitter may measure the qubits 510A and 514A in Z-axis measurement basis and may perform anti-control encoding 516A of a control operation on associated half of a bell pair (i.e., the qubit 510A). The transmitter 102 may then send classical measurement results including classic bits to the receiver 104.

Further, the receiver 104 may receive classical information and may perform correct anti-control decoding operation 518A. Based on a state of the classic bits, the receiver 104 may then apply specific restoration operation to the qubit 512A (i.e., receiver's half of the Bell pair) to complete the teleportation process.

In some examples, in the circuit diagram 504A shown in FIG. 5A, the transmitter 102 may prepare two qubits 520A and 522A in an entangled quantum state (i.e., a Bell state) using a Hadamard gate and a controlled NOT (CNOT) operation. The transmitter 102 may then send the qubit 522A to the receiver 104. Also, the transmitter 102 may prepare a qubit 524A with secret information and entangles the qubit 524A down into the qubit 520A using additional quantum operations. The transmitter may measure the qubits 524A and 520A in Z-axis measurement basis and may perform anti-control encoding 526A of a control operation on associated half of a bell pair. The transmitter 102 may then send classical measurement results including classic bits to the receiver 104. Further, the receiver 104 may receive classical information and may perform incorrect anti-control decoding operation 528A to fail the teleportation process.

In some examples, in the circuit diagram 506A shown in FIG. 5A, the transmitter 102 may prepare two qubits 530A and 532A in an entangled quantum state (i.e., a Bell state) using a Hadamard gate and a controlled NOT (CNOT) operation. The transmitter 102 may then send the qubit 532A to the receiver 104. Also, the transmitter 102 may prepare a qubit 534A with secret information and entangles the qubit 534A down into the qubit 530A using additional quantum operations. The transmitter may measure the qubits 530A and 534A in Z-axis measurement basis and may perform anti-control encoding 536A of a control operation on associated half of a bell pair. The transmitter 102 may then send classical measurement results including classic bits to the receiver 104.

Further, the receiver 104 may receive classical information and may perform correct anti-control decoding operation by applying identical gates 538A based on controlled gates. Based on a state of the classic bits, the receiver 104 may then apply specific restoration operation to the qubit 532A (i.e., receiver's half of the Bell pair) to complete the teleportation process.

In some examples, in the circuit diagram 508A shown in FIG. 5A, the transmitter 102 may prepare two qubits 540A and 542A in an entangled quantum state (i.e., a Bell state) using a Hadamard gate and a controlled NOT (CNOT) operation. The transmitter 102 may then send the qubit 542A to the receiver 104. Also, the transmitter 102 may prepare a qubit 544A with secret information and entangles the qubit 544A down into the qubit 540A using additional quantum operations. The transmitter may measure the qubits 540A and 544A in Z-axis measurement basis and may perform alternative way of anti-control encoding 546A of a control operation on associated half of a bell pair. The transmitter 102 may then send classical measurement results including classic bits to the receiver 104.

Further, the receiver 104 may receive classical information and may perform correct anti-control decoding operation. Based on a state of the classic bits, the receiver 104 may then apply specific restoration operation to the qubit 542A (i.e., receiver's half of the Bell pair) to complete the teleportation process.

In some examples, in the circuit diagram 502B shown in FIG. 5B, the transmitter 102 may prepare two qubits 510B and 512B in an entangled quantum state (i.e., a Bell state) using a Hadamard gate and a controlled NOT (CNOT) operation. The transmitter 102 may then send the qubit 512B to the receiver 104. Also, the transmitter 102 may prepare a qubit 514B with secret information and entangles the qubit 514B down into the qubit 510B using additional quantum operations. The transmitter may measure the qubits 510B and 514B in Z-axis measurement basis and may perform anti-control encoding 516B of a control operation on the associated secret qubit 514B. The transmitter 102 may then send classical measurement results including classic bits to the receiver 104.

Further, the receiver 104 may receive classical information and may perform correct anti-control decoding operation 518B. Based on a state of the classic bits, the receiver 104 may then apply specific restoration operation to the qubit 512B (i.e., receiver's half of the Bell pair) to complete the teleportation process.

In some examples, in the circuit diagram 504B shown in FIG. 5B, the transmitter 102 may prepare two qubits 520B and 522B in an entangled quantum state (i.e., a Bell state) using a Hadamard gate and a controlled NOT (CNOT) operation. The transmitter 102 may then send the qubit 522B to the receiver 104. Also, the transmitter 102 may prepare a qubit 524B with secret information and entangles the qubit 524B down into the qubit 520B using additional quantum operations. The transmitter may measure the qubits 524B and 520B in Z-axis measurement basis and may perform anti-control encoding 526B of a control operation on the associated secret qubit 524B. The transmitter 102 may then send classical measurement results including classic bits to the receiver 104. Further, the receiver 104 may receive classical information and may perform incorrect anti-control decoding operation 528B to fail the teleportation process.

In some examples, in the circuit diagram 506B shown in FIG. 5B, the transmitter 102 may prepare two qubits 530B and 532B in an entangled quantum state (i.e., a Bell state) using a Hadamard gate and a controlled NOT (CNOT) operation. The transmitter 102 may then send the qubit 532B to the receiver 104. Also, the transmitter 102 may prepare a qubit 534B with secret information and entangles the qubit 534B down into the qubit 530B using additional quantum operations. The transmitter may measure the qubits 530B and 534B in Z-axis measurement basis and may perform anti-control encoding 536B of a control operation on the associated secret qubit 534B. The transmitter 102 may then send classical measurement results including classic bits to the receiver 104.

Further, the receiver 104 may receive classical information and may perform correct anti-control decoding operation by applying identical gates 538B based on controlled gates. Based on a state of the classic bits, the receiver 104 may then apply specific restoration operation to the qubit 532B (i.e., receiver's half of the Bell pair) to complete the teleportation process.

In some examples, in the circuit diagram 508B shown in FIG. 5B, the transmitter 102 may prepare two qubits 540B and 542B in an entangled quantum state (i.e., a Bell state) using a Hadamard gate and a controlled NOT (CNOT) operation. The transmitter 102 may then send the qubit 542B to the receiver 104. Also, the transmitter 102 may prepare a qubit 544B with secret information and entangles the qubit 544B down into the qubit 540B using additional quantum operations. The transmitter may measure the qubits 540B and 544B in Z-axis measurement basis and may perform alternative way of anti-control encoding 546B of a control operation on the associated secret qubit 544B. The transmitter 102 may then send classical measurement results including classic bits to the receiver 104.

Further, the receiver 104 may receive classical information and may perform correct anti-control decoding operation 548B. Based on a state of the classic bits, the receiver 104 may then apply specific restoration operation to the qubit 542B (i.e., receiver's half of the Bell pair) to complete the teleportation process.

In some examples, in the circuit diagram 502C shown in FIG. 5C, the transmitter 102 may prepare two qubits 510C and 512C in an entangled quantum state (i.e., a Bell state) using a Hadamard gate and a controlled NOT (CNOT) operation. The transmitter 102 may then send the qubit 512C to the receiver 104. Also, the transmitter 102 may prepare a qubit 514C with secret information and entangles the qubit 514C down into the qubit 510C using additional quantum operations. The transmitter may measure the qubits 510C and 514C in Z-axis measurement basis and may perform anti-control encoding 516C of a control operation on the associated secret qubit 514C and the entangled qubit 510C (i.e., transmitter's half of a bell pair). The transmitter 102 may then send classical measurement results including classic bits to the receiver 104.

Further, the receiver 104 may receive classical information and may perform correct anti-control decoding operation 518C. Based on a state of the classic bits, the receiver 104 may then apply specific restoration operation to the qubit 512C (i.e., receiver's half of the Bell pair) to complete the teleportation process.

In some examples, in the circuit diagram 504C shown in FIG. 5C, the transmitter 102 may prepare two qubits 520C and 522C in an entangled quantum state (i.e., a Bell state) using a Hadamard gate and a controlled NOT (CNOT) operation. The transmitter 102 may then send the qubit 522C to the receiver 104. Also, the transmitter 102 may prepare a qubit 524C with secret information and entangles the qubit 524C down into the qubit 520C using additional quantum operations. The transmitter may measure the qubits 524C and 520C in Z-axis measurement basis and may perform anti-control encoding 526C of a control operation on the associated secret qubit 524C and the entangled qubit 520C. The transmitter 102 may then send classical measurement results including classic bits to the receiver 104. Further, the receiver 104 may receive classical information and may perform incorrect anti-control decoding operation 528C to fail the teleportation process and receive corrupted bit 550C.

In some examples, in the circuit diagram 506C shown in FIG. 5C, the transmitter 102 may prepare two qubits 530C and 532C in an entangled quantum state (i.e., a Bell state) using a Hadamard gate and a controlled NOT (CNOT) operation. The transmitter 102 may then send the qubit 532C to the receiver 104. Also, the transmitter 102 may prepare a qubit 534C with secret information and entangles the qubit 534C down into the qubit 530C using additional quantum operations. The transmitter may measure the qubits 530C and 534C in Z-axis measurement basis and may perform anti-control encoding 536C of a control operation on the associated secret qubit 534B and the entangled qubit 530C. The transmitter 102 may then send classical measurement results including classic bits to the receiver 104.

Further, the receiver 104 may receive classical information and may perform correct anti-control decoding operation by applying identical gates 538C, in any order, based on controlled gates. Based on a state of the classic bits, the receiver 104 may then apply specific restoration operation to the qubit 532C (i.e., receiver's half of the Bell pair) to complete the teleportation process.

In some examples, in the circuit diagram 508C shown in FIG. 5C, the transmitter 102 may prepare two qubits 540C and 542C in an entangled quantum state (i.e., a Bell state) using a Hadamard gate and a controlled NOT (CNOT) operation. The transmitter 102 may then send the qubit 542C to the receiver 104. Also, the transmitter 102 may prepare a qubit 544C with secret information and entangles the qubit 544C down into the qubit 540C using additional quantum operations. The transmitter may measure the qubits 540C and 544C in Z-axis measurement basis and may perform alternative way of anti-control encoding 546C of a control operation on the associated secret qubit 544C and the entangled qubit 540C. The transmitter 102 may then send classical measurement results including classic bits to the receiver 104.

Further, the receiver 104 may receive classical information and may perform correct anti-control decoding operation 548C. Based on a state of the classic bits, the receiver 104 may then apply specific restoration operation to the qubit 542C (i.e., receiver's half of the Bell pair) to complete the teleportation process.

In some examples, while performing anti-control teleportation for Z measurement basis and upon placing X gate or Y gate on the entangled qubit, the bob's state, bits from Alice and operations may include:

| Bob's State | Bits from Alice | Operation |
|---|---|---|
| $\alpha\|1\rangle + \beta\|0\rangle$ | 00 | X |
| $\alpha\|0\rangle + \beta\|1\rangle$ | 01 | I |
| $\alpha\|1\rangle - \beta\|0\rangle$ | 10 | XZ |
| $\alpha\|0\rangle - \beta)\|1\rangle$ | 11 | Z |

In some examples, while performing anti-control teleportation for Z measurement basis and upon placing X gate or Y gate on the secret qubit, the bob's state, bits from Alice and operations may include:

| Bob's State | Bits from Alice | Operation |
|---|---|---|
| $\alpha\|0\rangle - \beta\|1\rangle$ | 00 | Z |
| $\alpha\|1\rangle - \beta\|0\rangle$ | 01 | XZ |
| $\alpha\|0\rangle + \beta\|1\rangle$ | 10 | I |
| $\alpha\|1\rangle + \beta)\|0\rangle$ | 11 | X |

In some examples, the quantum teleportation circuit diagrams 500D-500E depicts usage of mixed measurements. In an example implementation, in the circuit diagram 502D shown in FIG. 5D, the transmitter 102 may prepare two qubits 510D and 512D in an entangled quantum state (i.e., a Bell state) using a Hadamard gate and a controlled NOT (CNOT) operation. The transmitter 102 may then send the qubit 512D to the receiver 104. Also, the transmitter 102 may prepare a qubit 514D with secret information and entangles the qubit 514D down into the qubit 510D using additional quantum operations. The transmitter may measure the qubit 510D with –Y-axis measurement basis 542D and the qubit 514D in Z-axis measurement basis and may then send classical measurement results including classic bits to the receiver 104.

Further, the receiver 104 may receive classical information and based on a state of the classic bits, the receiver 104 may then apply specific restoration operation 516D to the qubit 512D (i.e., receiver's half of the Bell pair), culminating in the teleportation of the information in the qubit 514D (i.e., correct secret qubit) to the receiver 104.

In some examples, an output state of the circuit diagram 502D may be $$(I\otimes H\otimes I)(I\otimes S\otimes I)(H\otimes I\otimes I)(CNOT\otimes I)(|\text{Secret}\rangle\otimes|\text{Bell}\rangle)$$
$$=\frac{\sqrt{2}}{4}(|00\rangle(\alpha+i\beta)|0\rangle+(i\alpha-\beta)|1\rangle)$$
$$+|01\rangle((\alpha-i\beta|0\rangle-(i\alpha-\beta)1\rangle)$$
$$+|10(\alpha-i\beta)|0\rangle+(i\alpha-\beta)|1\rangle)$$
$$-|11\rangle((\alpha+i\beta)|0\rangle-(i\alpha+\beta)|1\rangle))$$

In this example, the transformations that needs to apply may be

| Bob's State | Bits from Alice | Operation |
|---|---|---|
| $(\alpha+i\beta)|0\rangle+(i\alpha-\beta)|1\rangle)$ | 00 | $\sqrt{X}$ |
| $(\alpha-i\beta|0\rangle-(i\alpha-\beta)|1\rangle$ | 01 | $\sqrt{X}X$ |
| $(\alpha-i\beta)|0\rangle+(i\alpha-\beta)|1\rangle$ | 10 | $\sqrt{X}\,Y$ |
| $(\alpha+i\beta)|0\rangle-(i\alpha+\beta)|1\rangle$ | 11 | $\sqrt{X}YX$ |

Figure 5D:
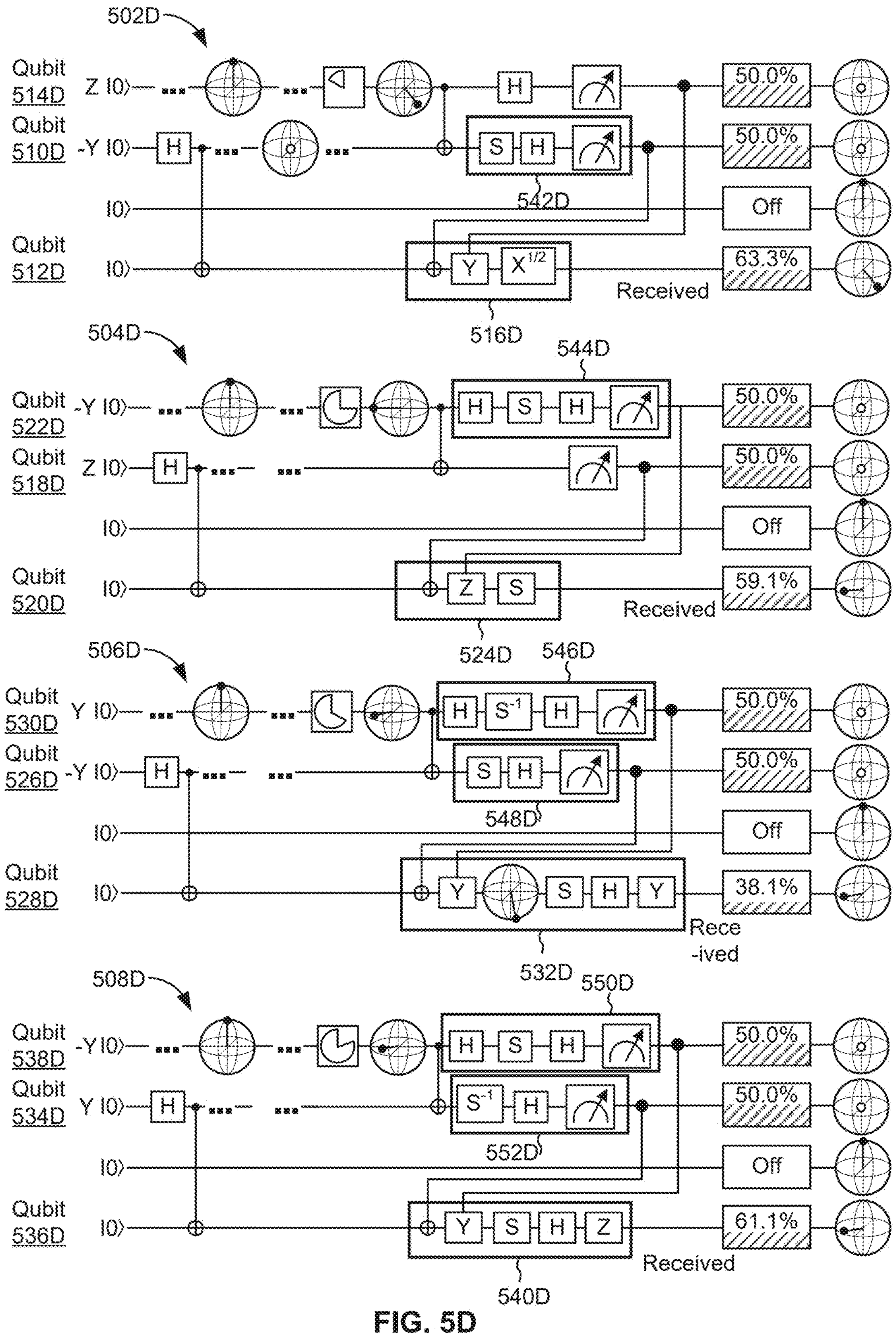
FIGS. 5D-5E depict exemplary quantum teleportation circuit diagrams with mixed measurements, in accordance with implementations of the present disclosure.

In an example implementation, in the circuit diagram 504D shown in FIG. 5D, the transmitter 102 may prepare two qubits 518D and 520D in an entangled quantum state (i.e., a Bell state) using a Hadamard gate and a controlled NOT (CNOT) operation. The transmitter 102 may then send the qubit 520D to the receiver 104. Also, the transmitter 102 may prepare a qubit 522D with secret information and entangles the qubit 522D down into the qubit 518D using additional quantum operations. The transmitter may measure the qubit 518D with Z-axis measurement basis and the qubit 522D in −Y-axis measurement basis 544D and may then send classical measurement results including classic bits to the receiver 104.

Further, the receiver 104 may receive classical information and based on a state of the classic bits, the receiver 104 may then apply specific restoration operation 524D to the qubit 520D (i.e., receiver's half of the Bell pair), culminating in the teleportation of the information in the qubit 522D (i.e., correct secret qubit) to the receiver 104.

In some examples, an output state of the circuit diagram 504D may be $$(H\otimes I\otimes I)(S\otimes I\otimes I)(H\otimes I\otimes I)(CNOT\otimes I)(|\text{Secret}\rangle\otimes|\text{Bell}\rangle)$$
$$=\frac{\sqrt{2}}{4}(|00\rangle(\alpha|1+i)|0\rangle+\beta(1-i)|1\rangle)$$
$$+|01\rangle(\beta(1-i)|0\rangle+\alpha(1+i)|1\rangle)$$
$$+|10\rangle(\alpha(1-i)|0\rangle+\beta(1+i)|1\rangle)$$
$$+|11\rangle(\beta(1+i)|0\rangle+\alpha(1-i)|1\rangle)))$$

In this example, the transformations that needs to applied may include:

| Bob's State | Bits from Alice | Operation |
|---|---|---|
| $\alpha(1+i)|0\rangle+\beta\,(1-i)|1\rangle$ | 00 | S |
| $\beta(1-i)|0\rangle+\alpha(1+i)|1\rangle)$ | 01 | SX |
| $\alpha(1-i)|0\rangle+\beta\,(1+i)|1\rangle)$ | 10 | SZ |
| $\beta(1+i)|0\rangle+\alpha(1-i)|1\rangle)$ | 11 | SXZ |

In an example implementation, in the circuit diagram 506D shown in FIG. 5D, the transmitter 102 may prepare two qubits 526D and 528D in an entangled quantum state (i.e., a Bell state) using a Hadamard gate and a controlled NOT (CNOT) operation. The transmitter 102 may then send the qubit 528D to the receiver 104. Also, the transmitter 102 may prepare a qubit 530D with secret information and entangles the qubit 530D down into the qubit 526D using additional quantum operations. The transmitter may measure the qubit 526D with −Y-axis measurement basis 548D and the qubit 530D in Y-axis measurement basis 550D and may then send classical measurement results including classic bits to the receiver 104.

Further, the receiver 104 may receive classical information and based on a state of the classic bits, the receiver 104 may then apply specific restoration operation 532D to the qubit 528D (i.e., receiver's half of the Bell pair), culminating in the teleportation of the information in the qubit 530D (i.e., correct secret qubit) to the receiver 104.

For example, an output state of the circuit diagram 506D may be $$(H\otimes H\otimes I)(S\otimes S^{+}\otimes I)(H\otimes I\otimes I)(CNOT\otimes I)(|\text{Secret}\rangle\otimes|\text{Bell}\rangle)$$
$$=\frac{1}{4}(|00\rangle(1-i)(\alpha-\beta)|0\rangle+(1+i)(\alpha+\beta)|1\rangle)$$
$$+|01\rangle((1-i)(\alpha+\beta)|0\rangle-(1+i)(\alpha-\beta)|1\rangle)$$
$$+|10\rangle((1+i)(\alpha+\beta)|0\rangle-(1-i)(\alpha-\beta)|1\rangle)$$
$$-|11\rangle((1+i)(\alpha-\beta)|0\rangle+(1-i)(\alpha-\beta)|1\rangle))$$

Further, in this example, the transformations that needs to apply may include:

| Bob's State | Bits from Alice | Operation |
|---|---|---|
| $(1-i)(\alpha-\beta)|0\rangle+(1+i)(\alpha+\beta)|1$ | 00 | YHS |
| $(1-i)(\alpha+\beta)|0\rangle-(1+i)(\alpha-\beta)|1\rangle)$ | 01 | YHSX |
| $(1+i)(\alpha+\beta)|0\rangle-(1-i)(\alpha-\beta)|1\rangle)$ | 10 | YHSY |
| $(1+i)(\alpha-\beta)|0\rangle+(1-i)(\alpha+\beta)|1\rangle$ | 11 | YHSYX |

In an example implementation, in the circuit diagram 508D shown in FIG. 5D, the transmitter 102 may prepare two qubits 534D and 536D in an entangled quantum state (i.e., a Bell state) using a Hadamard gate and a controlled NOT (CNOT) operation. The transmitter 102 may then send the qubit 536D to the receiver 104. Also, the transmitter 102 may prepare a qubit 538D with secret information and entangles the qubit 538D down into the qubit 534D using additional quantum operations. The transmitter may measure the qubit 534D with Y-axis measurement basis 552D and the qubit 538D in −Y-axis measurement basis 550D and may then send classical measurement results including classic bits to the receiver 104.

Further, the receiver 104 may receive classical information and based on a state of the classic bits, the receiver 104 may then apply specific restoration operation 540D to the qubit 536D (i.e., receiver's half of the Bell pair), culminating in the teleportation of the information in the qubit 538D (i.e., correct secret qubit) to the receiver 104.

For example, an output state of the circuit diagram 508D may be $$
\begin{aligned}
&(H \otimes H \otimes I)(S \otimes S^{+} \otimes I)(H \otimes I \otimes I)(CNOT \otimes I)(|\text{Secret}\rangle \otimes |\text{Bell}\rangle) \\
&= \frac{1}{4}(|00\rangle(1+i)(\alpha-\beta)|0\rangle + (1-i)(\alpha+\beta)|1\rangle) \\
&+|01\rangle((1+i)(\alpha+\beta)|0\rangle - (1-i)(\alpha-\beta)|1\rangle) \\
&+|10\rangle((1-i)(\alpha+\beta)|0\rangle + (1+i)(\alpha-\beta)|1\rangle) \\
&-|11\rangle((1-i)(\alpha-\beta)|0\rangle + (1+i)(\alpha+\beta)|1\rangle))
\end{aligned}
$$

Further, in this example, the transformations that needs to apply may include:

| Bob's State | Bits from Alice | Operation |
| --- | --- | --- |
| $(1 + i)(\alpha - \beta)|0\rangle + (1 - i)(\alpha + \beta)|1$ | 00 | ZHS |
| $(1 + i)(\alpha + \beta)|0\rangle - (1 - i)(\alpha - \beta)|1\rangle)$ | 01 | ZHSX |
| $(1 - i)(\alpha + \beta)|0\rangle - (1 + i)(\alpha - \beta)|1\rangle)$ | 10 | ZHSY |
| $(1 - i)(\alpha - \beta)|0\rangle + (1 + i)(\alpha + \beta)|1\rangle$ | 11 | ZHSYX |

Figure 5E:
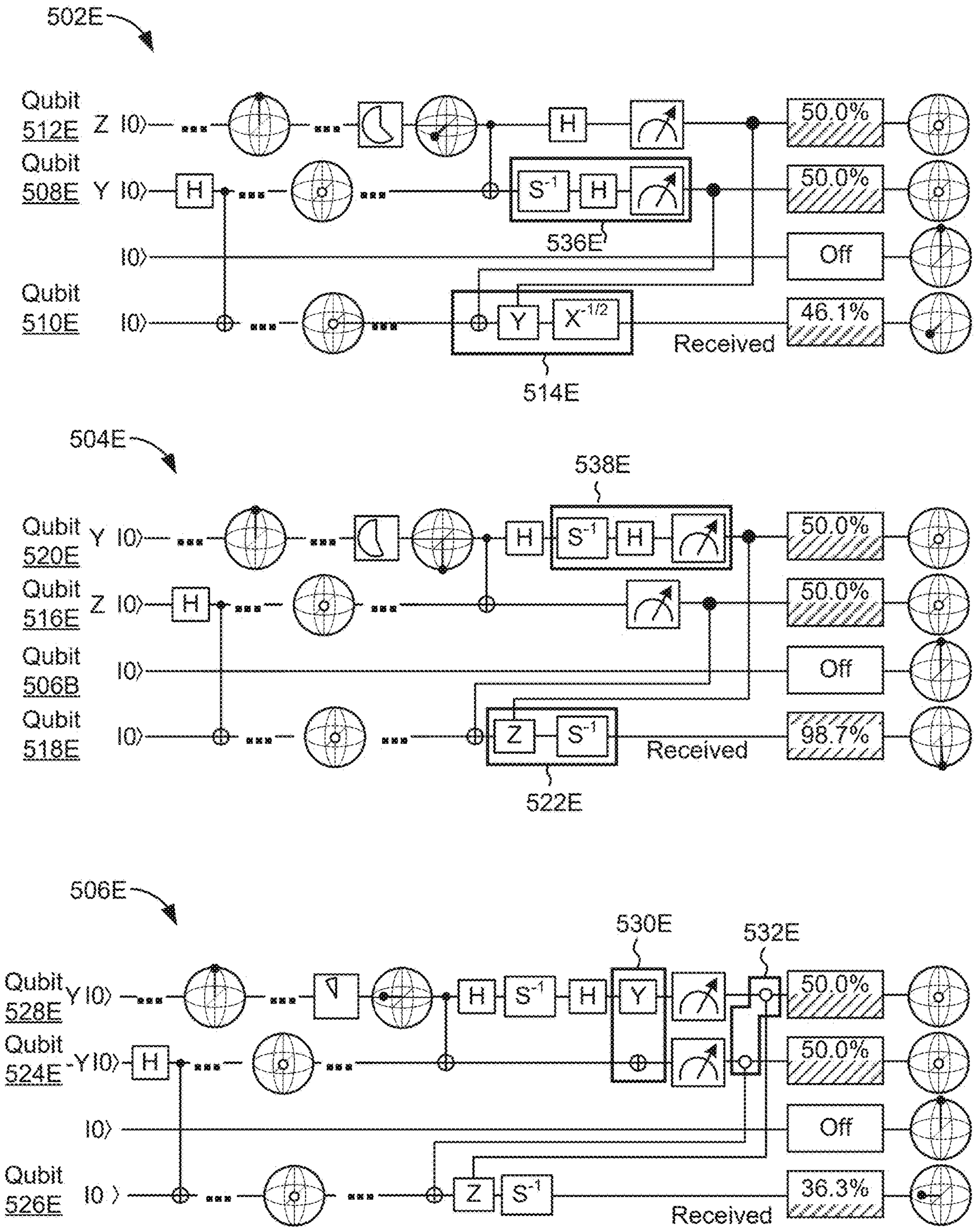

In an example implementation, in the circuit diagram 502E shown in FIG. 5E, the transmitter 102 may prepare two qubits 508E and 510E in an entangled quantum state (i.e., a Bell state) using a Hadamard gate and a controlled NOT (CNOT) operation. The transmitter 102 may then send the qubit 510E to the receiver 104. Also, the transmitter 102 may prepare a qubit 512E with secret information and entangles the qubit 510E down into the qubit 508E using additional quantum operations. The transmitter may measure the qubit 508E with Y-axis measurement basis 536E and the qubit 512E in Z-axis measurement basis and may then send classical measurement results including classic bits to the receiver 104.

Further, the receiver 104 may receive classical information and based on a state of the classic bits, the receiver 104 may then apply specific restoration operation 514E to the qubit 510E (i.e., receiver's half of the Bell pair), culminating in the teleportation of the information in the qubit 512E (i.e., correct secret qubit) to the receiver 104.

For example, an output state of the circuit diagram 502E may be $$
\begin{aligned}
&(I \otimes H \otimes I)(I \otimes S^{+} \otimes I)(H \otimes I \otimes I)(CNOT \otimes I)(|\text{Secret}\rangle \otimes |\text{Bell}\rangle) \\
&= \frac{\sqrt{2}}{4}(|00\rangle(\alpha - i\beta)|0\rangle - (i\alpha - \beta)|1\rangle) \\
&+|01\rangle((\alpha + i\beta|0\rangle + (i\alpha + \beta)|1\rangle) \\
&+|10\rangle(\alpha + i\beta)|0\rangle - (i\alpha + \beta)|1\rangle) \\
&-|11\rangle((\alpha - i\beta)|0\rangle + (i\alpha - \beta)|1\rangle))
\end{aligned}
$$

Further, in this example, the transformations that needs to apply may include:

| Bob's State | Bits from Alice | Operation |
| --- | --- | --- |
| $(\alpha - i\beta)|0\rangle - (i\alpha - \beta)|1\rangle)$ | 00 | $\sqrt{\overline{X}}^{+}$ |
| $(\alpha + i\beta|0\rangle + (i\alpha + \beta)|1\rangle$ | 01 | $\sqrt{\overline{X}}^{+}X$ |
| $(\alpha + i\beta)|0\rangle - (i\alpha + \beta)|1\rangle$ | 10 | $\sqrt{\overline{X}}^{+}\ Y$ |
| $(\alpha - i\beta)|0\rangle + (i\alpha - \beta)|1\rangle$ | 11 | $\sqrt{\overline{X}}^{+}YX$ |

In an example implementation, in the circuit diagram 504E shown in FIG. 5E, the transmitter 102 may prepare two qubits 516E and 518E in an entangled quantum state (i.e., a Bell state) using a Hadamard gate and a controlled NOT (CNOT) operation. The transmitter 102 may then send the qubit 518E to the receiver 104. Also, the transmitter 102 may prepare a qubit 520E with secret information and entangles the qubit 520E down into the qubit 516E using additional quantum operations. The transmitter may measure the qubit 516E with Z-axis measurement basis and the qubit 520E in Y-axis measurement basis 538E and may then send classical measurement results including classic bits to the receiver 104.

Further, the receiver 104 may receive classical information and based on a state of the classic bits, the receiver 104 may then apply specific restoration operation 522E to the qubit 518E (i.e., receiver's half of the Bell pair), culminating in the teleportation of the information in the qubit 520E (i.e., correct secret qubit) to the receiver 104.

For example, an output state of the circuit diagram 504E may be $$
\begin{aligned}
&(H \otimes I \otimes I)(S^{+} \otimes I \otimes I)(H \otimes I \otimes I)(CNOT \otimes I)(|\text{Secret}\rangle \otimes |\text{Bell}\rangle) \\
&= \frac{\sqrt{2}}{4}(|00\rangle(\alpha|1 - i)|0\rangle + \beta(1 + i)|\rangle) \\
&+|01\rangle(\beta(1 + i)|0\rangle + \alpha(1 - i)|1\rangle) \\
&+|10\rangle(\alpha(1 + i)|0\rangle + \beta(1 - i)|1\rangle) \\
&+|11\rangle(\beta(1 - i)|0\rangle + \alpha(1 + i)|\rangle)))
\end{aligned}
$$

Further, in this example, the transformations that needs to apply may include:

| Bob's State | Bits from Alice | Operation |
| --- | --- | --- |
| $\alpha(1 - i)|0\rangle + \beta\ (1 + i)|1\rangle$ | 00 | $S^{+}$ |
| $(\alpha - \beta)\ |0\rangle + i\ (\alpha + \beta)|1\rangle$ | 01 | $S^{+}X$ |
| $i(\alpha - \beta)\ |0\rangle + (\alpha + \beta)|1\rangle$ | 10 | $S^{+}Z$ |
| $i(\alpha + \beta)\ |0\rangle - (\alpha - \beta)|1\rangle)$ | 11 | $S^{+}XZ$ |

In an example implementation, the circuit diagram 506E, shown in FIG. 5E, depicts mixed measurements and anti-control operations during the quantum teleportation. The transmitter 102 may prepare two qubits 524E and 526E in an entangled quantum state (i.e., a Bell state) using a Hadamard gate and a controlled NOT (CNOT) operation. The transmitter 102 may then send the qubit 526E to the receiver 104. Also, the transmitter 102 may prepare a qubit 528E with secret information and entangles the qubit 528E down into the qubit 524E using additional quantum operations. The transmitter may measure the qubit 524E with −Y-axis measurement basis and the qubit 528E in Y-axis measurement basis and may perform anti-control encoding 530E of a control operation on the associated secret qubit 528E and the entangled qubit 524E. The transmitter may then send classical measurement results including classic bits to the receiver 104.

Further, the receiver 104 may receive classical information and based on a state of the classic bits, the receiver 104 may then apply an anti-decoding operation 532E and specific restoration operation to the qubit 526E (i.e., receiver's half of the Bell pair) to complete the teleportation.

FIGS. 6A-6D depict exemplary quantum superdense coding circuit diagrams 600A-600D, in accordance with implementations of the present disclosure. For example, superdense coding is a procedure that allows the transmitter 102 to send two classic bits (i.e., secret bits) to the receiver 104 using a single qubit (i.e., a secret qubit) of communication. In the example shown in FIG. 6A, the transmitter 102 prepares two qubits 602A and 604A in an entangled quantum state (a Bell state) using a Hadamard gate 606A and a CNOT operation 608A. Also, the transmitter 102 may prepare a secret qubit with the secret classic bits 614A and entangles the secret qubit down into the qubit 602A using additional quantum operations The transmitter 102 may perform the additional quantum operations using z-axis measurement basis to the qubit 602A and the secret bits 614A, where the additional operations are based on the classic bits of information that the transmitter 102 wants to share with the receiver 104. The transmitter 102 transmits the qubit 602A to the receiver 104.

The receiver 104 receives the qubit 602A and performs quantum operations to obtain the classic bits of information that the transmitter 102 encoded in the qubit 602A. The quantum operations may include a restoration operation where the receiver 104 uses another qubit 610A to apply an inverse 612A of the quantum operations performed by the transmitter 102 to create the entangled quantum state, i.e., a CNOT gate followed by a Hadamard gate. The receiver 104 then measures the qubits 610A and 604A to obtain the two classic bits of information.

Figure 6A:
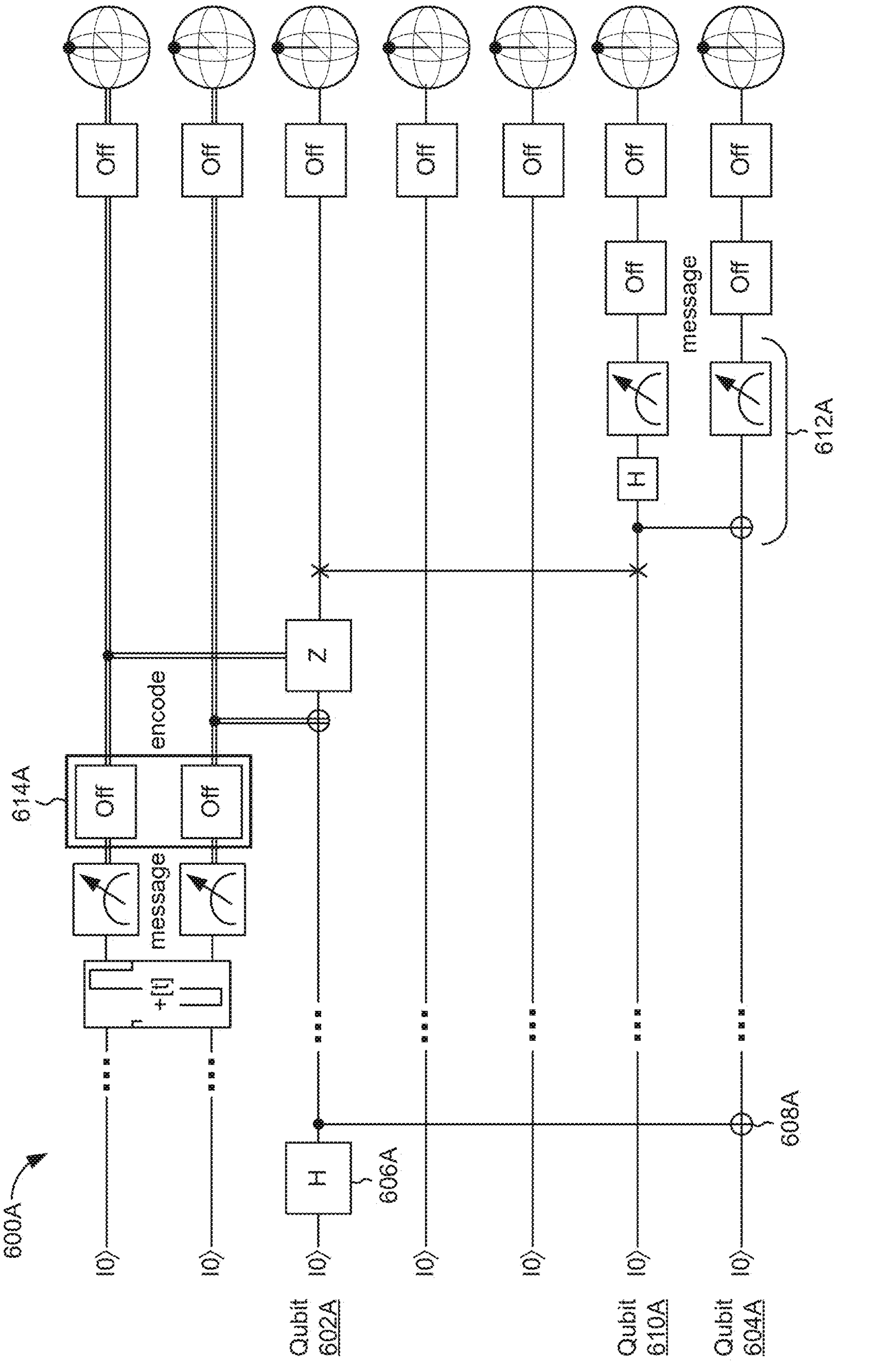
FIGS. 6A-6D depict exemplary quantum superdense coding circuit diagrams, in accordance with implementations of the present disclosure.
Figure 6B:
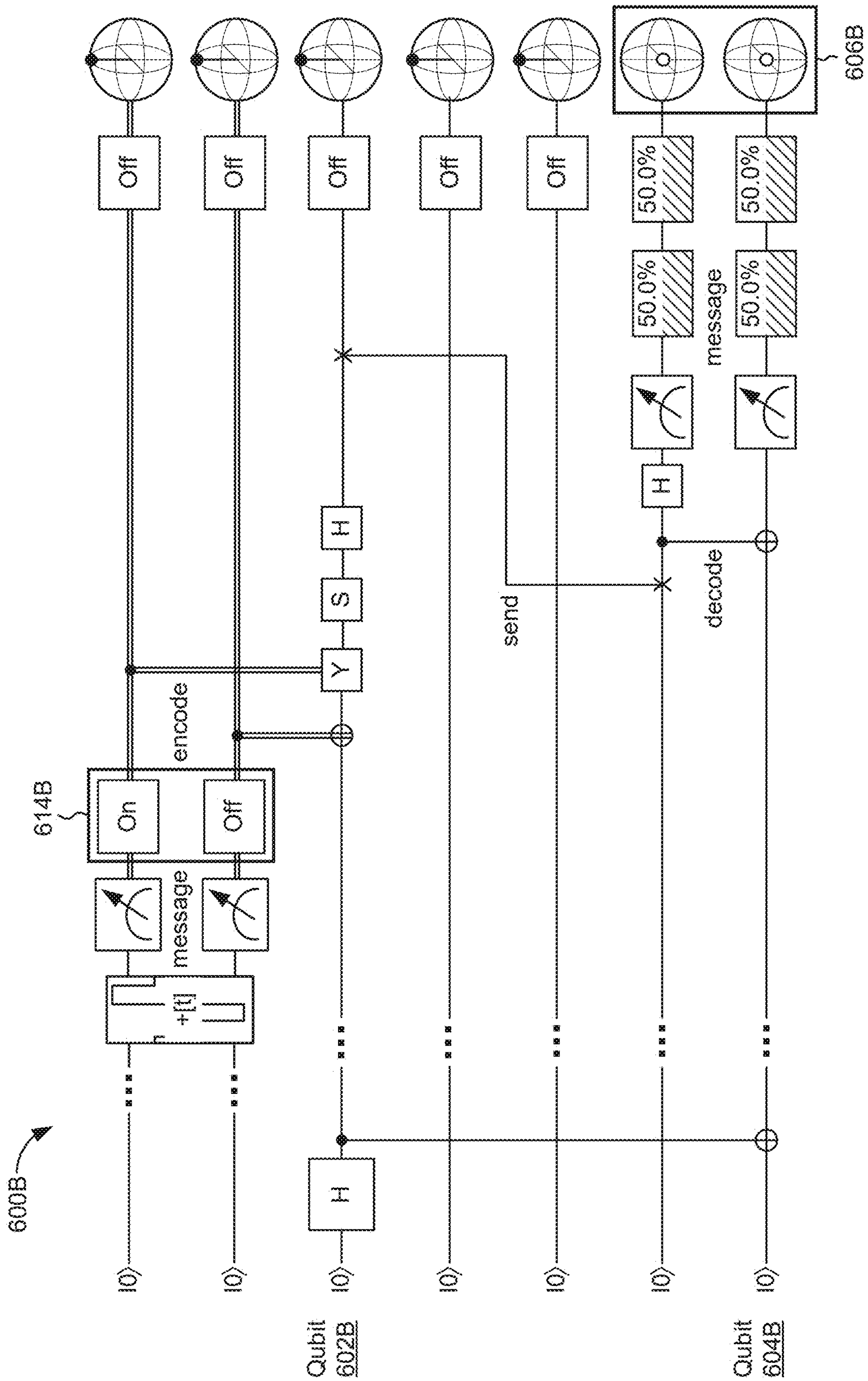

In the example shown in FIG. 6B, the transmitter 102 prepares two qubits 602B and 604B in an entangled quantum state (a Bell state) using a Hadamard gate and a CNOT operation. Also, the transmitter 102 may prepare a secret qubit with secret classic bits 614B and entangles the secret qubit down into the qubit 602B using additional quantum operations The transmitter 102 may perform the additional quantum operations using Y-axis measurement basis to the qubit 602B and the secret bits 614B, where the additional operations are based on the classic bits of information that the transmitter 102 wants to share with the receiver 104. The transmitter 102 transmits the qubit 602B to the receiver 104.

During transmission, an eavesdropper device (not shown in Figures) may intercept the transmission and performs quantum operations to obtain the secret information in the secret qubit that the transmitter 102 encoded in the qubit 602B. Since the eavesdropper device is not included in authorized parties who agreed, in advance, to use the secret information, the eavesdropper device does not know that a secret superposition quantum gate is used to prepare the entangled quantum state of the qubit 602B and the secret qubit. Therefore, eavesdropper device measures the qubit 602B and the secret qubit using a Z-axis basis measurement protocol to obtain two classic bits of information. The eavesdropper device then obtains a corrupted qubit 606B as the eavesdropper device used incorrect measurement protocol.

Figure 6C:
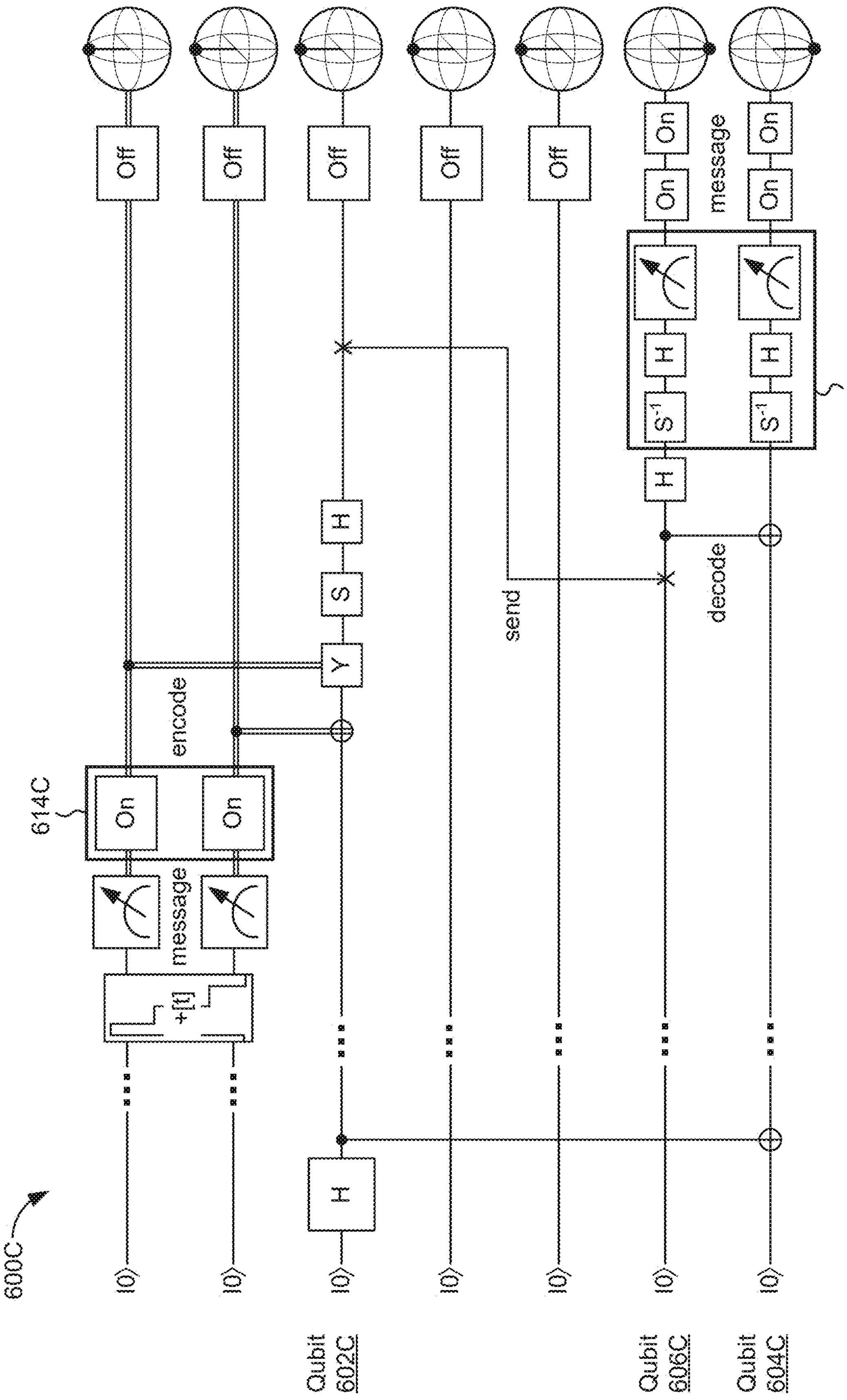

In the example shown in FIG. 6C, the transmitter 102 prepares two qubits 602C and 604C in an entangled quantum state (a Bell state) using a Hadamard gate and a CNOT operation. Also, the transmitter 102 may prepare a secret qubit with secret bits 614C and entangles the secret qubit down into the qubit 602C using additional quantum operations The transmitter 102 may perform the additional quantum operations using Y-axis measurement basis to the qubit 602C and the secret bits 614C, where the additional operations are based on the classic bits of information that the transmitter 102 wants to share with the receiver 104. The transmitter 102 transmits the qubit 602C to the receiver 104.

The receiver 104 receives the qubit 602C and performs quantum operations to obtain the classic bits of information that the transmitter 102 encoded in the qubit 602C. The quantum operations may include a restoration operation where the receiver 104 uses another qubit 606C to apply an inverse 608C of the quantum operations performed by the transmitter 102 to create the entangled quantum state using Y-axis measurement basis. The receiver 104 then measures the qubits 604C and 606C to obtain two correct classic bits of information.

Figure 6D:
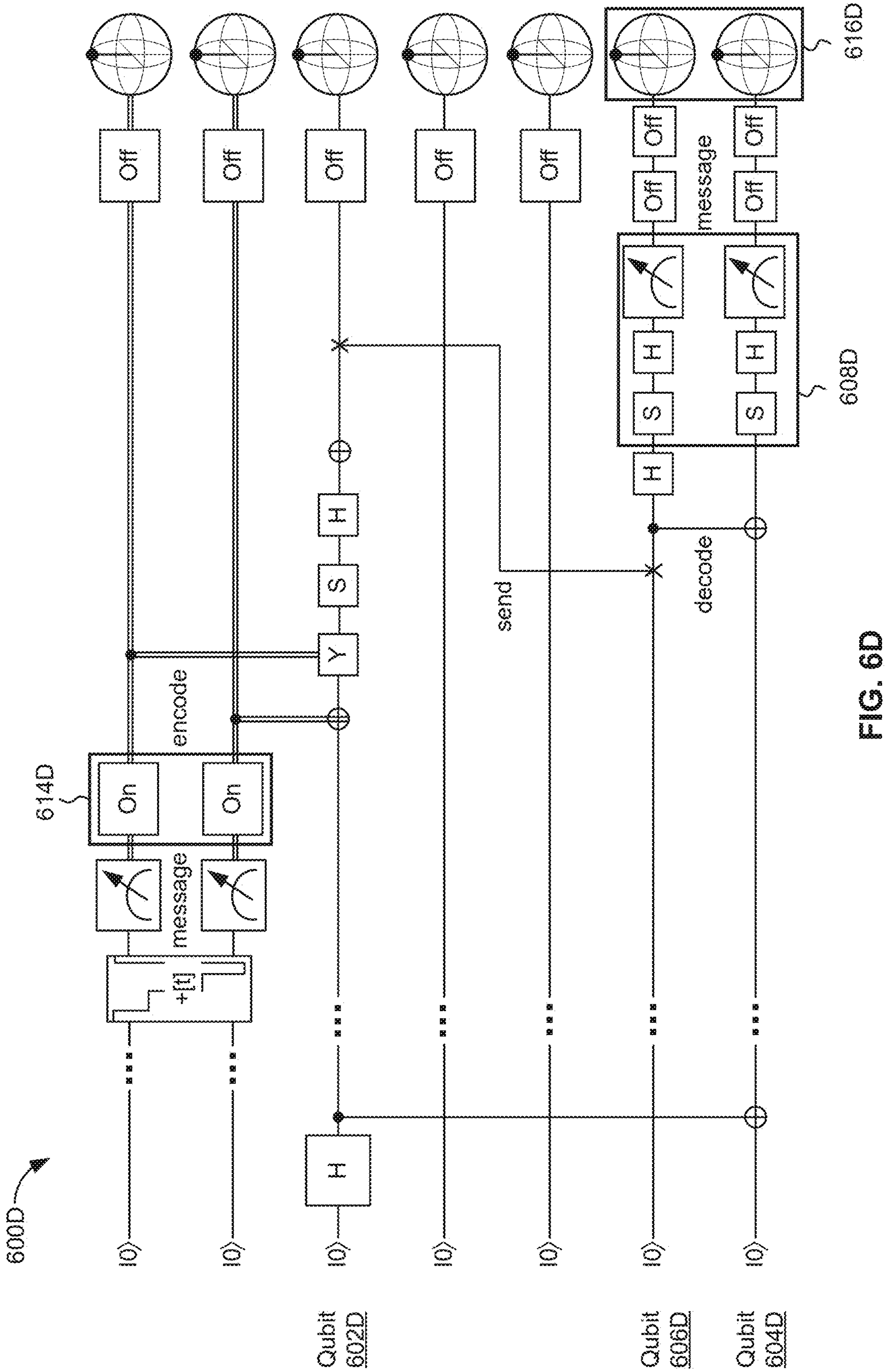

In the example shown in FIG. 6D, the transmitter 102 prepares two qubits 602D and 604D in an entangled quantum state (a Bell state) using a Hadamard gate and a CNOT operation. Also, the transmitter 102 may prepare a secret qubit with secret classic bits 614D and entangles the secret qubit down into the qubit 602D using additional quantum operations The transmitter 102 may perform the additional quantum operations using –Y-axis measurement basis to the qubit 602D and the secret bits 614D, where the additional operations are based on the classic bits of information that the transmitter 102 wants to share with the receiver 104. The transmitter 102 transmits the qubit 602D to the receiver 104.

The receiver 104 receives the qubit 602D and performs quantum operations to obtain the classic bits of information that the transmitter 102 encoded in the qubit 602D. The quantum operations may include a restoration operation where the receiver 104 uses another qubit 606D to apply an inverse 608D of the quantum operations performed by the transmitter 102 to create the entangled quantum state using –Y-axis measurement basis. The receiver 104 then measures the qubits 604D and 606D to obtain the two correct classic bits of information 616D.

In this instance, Alice readies two secret classic bits and entangles it with her part of the Bell pair, subsequently changing both qubits into Y basis. However, Eve, an eavesdropper, fails to unveil the secret stored due to her lack of access to Alice's out-of-band (OOB) message, which details the required measurement.

Figure 7A:
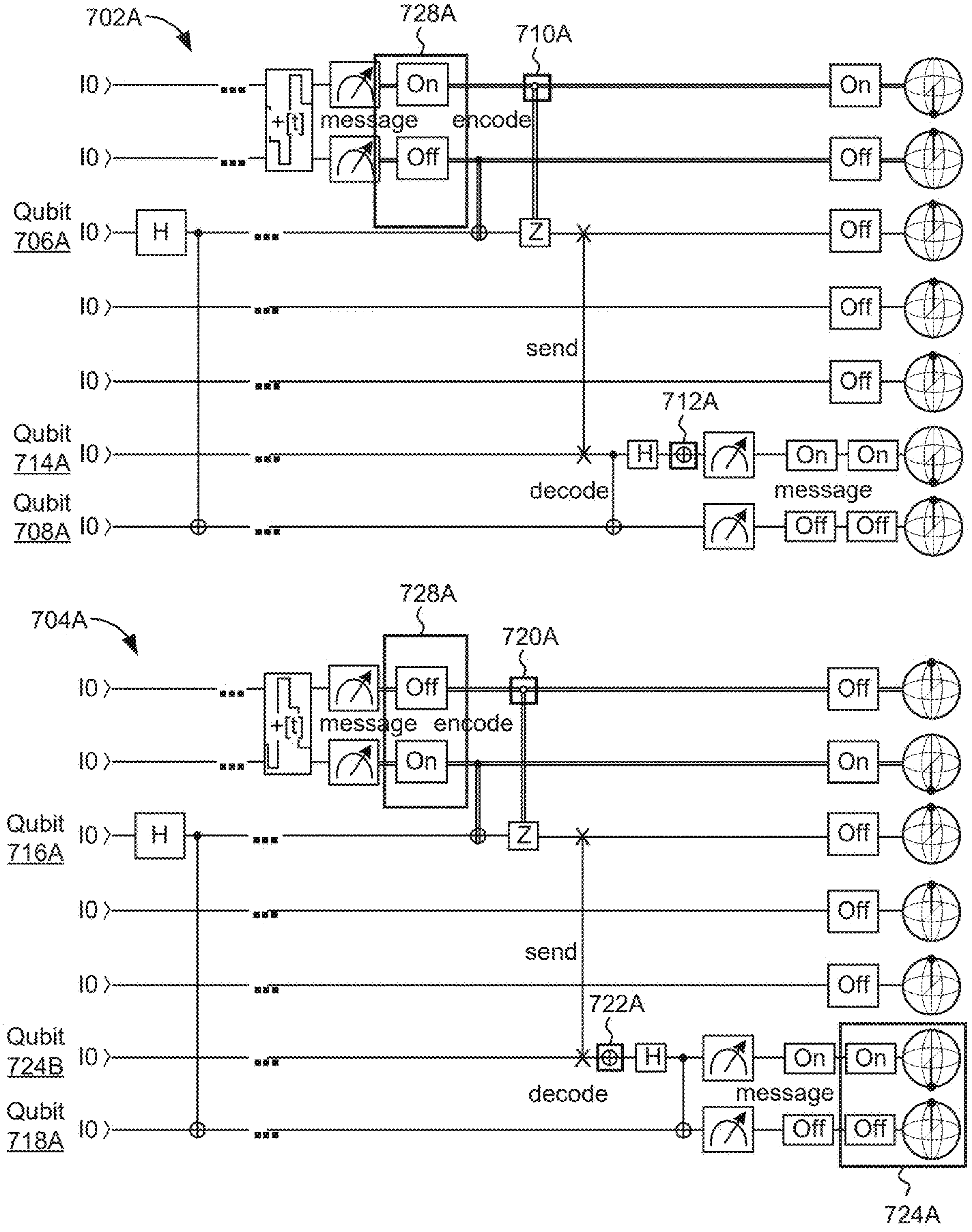
FIGS. 7A-7B depict exemplary anti-control quantum superdense coding circuit diagrams, in accordance with implementations of the present disclosure.
Figure 7B:
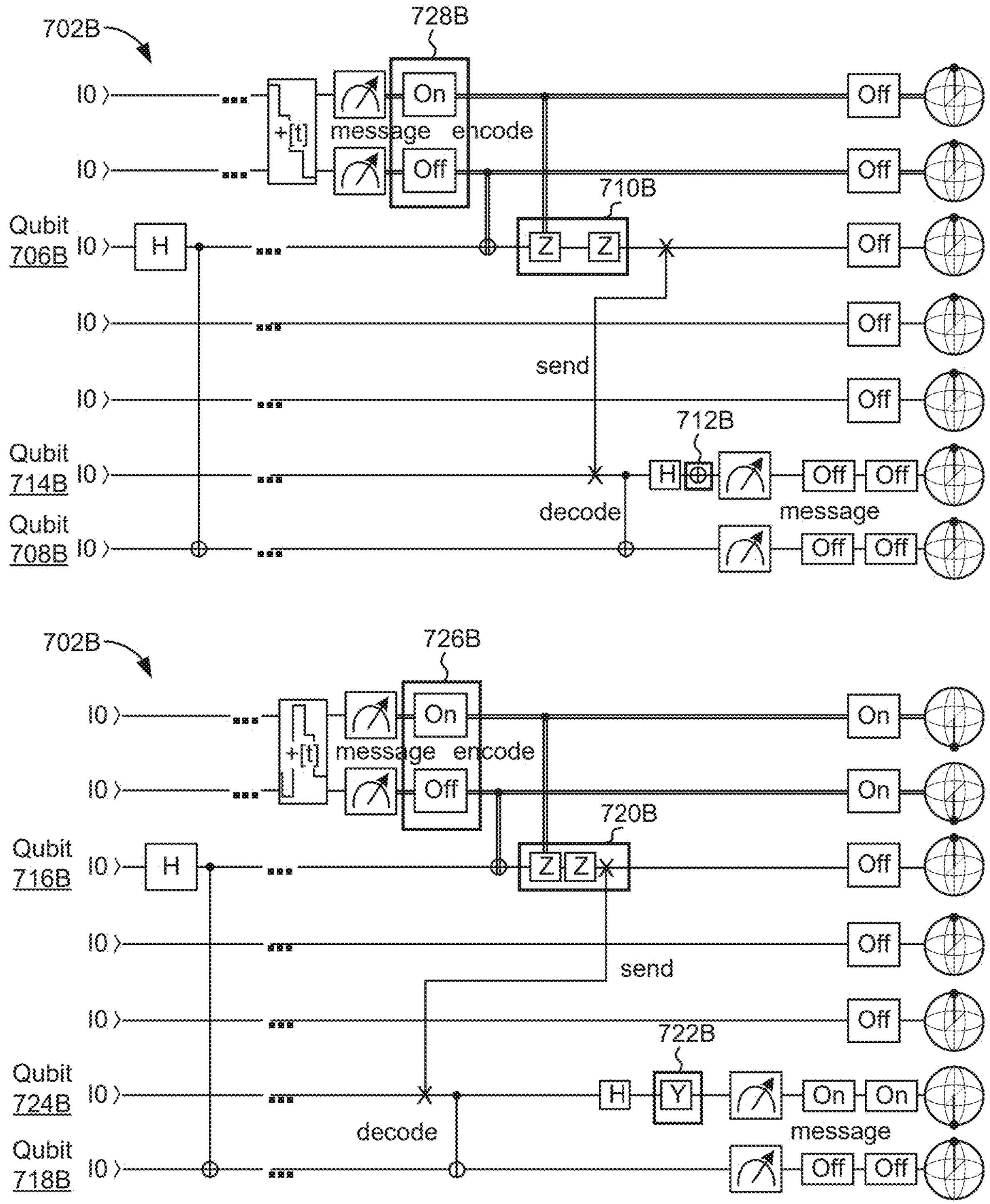

FIGS. 7A-7B depict exemplary anti-control quantum superdense coding circuit diagrams 700A-700B, in accordance with implementations of the present disclosure. In some examples, the circuit diagrams 700A-700B reveal that the transmitter 102 may perform qubit measurement on a secret basis and may conduct anti-control operations (communicated to the receiver 104 through the out of band channel), providing an added layer of security against potential interceptions by a third party (e.g., the eavesdropper device). Any assumption of a standard Z measurement by the eavesdropper device may result in incorrect information.

As shown in a circuit diagram 702A of FIG. 7A, the transmitter 102 prepares two qubits 706A and 708A in an entangled quantum state (a Bell state) using a Hadamard gate and a CNOT operation. Also, the transmitter 102 may prepare a secret qubit with secret bits 728A and entangles the secret qubit down into the qubit 706A using additional quantum operations The transmitter 102 may perform the additional quantum operations using Z-axis measurement basis to the qubit 706A and the secret bits 728A, where the additional operations are based on the classic bits of information that the transmitter 102 wants to share with the receiver 104. Further, the transmitter 102 may perform anti-control encoding 710A of a control operation on one or more of the secret bits. The transmitter 102 transmits the qubit 706A to the receiver 104.

The receiver 104 receives the qubit 706A and performs quantum operations to obtain the classic bits 728A of information that the transmitter 102 encoded in the qubit 706A. For example, the receiver 104 may perform anti-control decoding operation 712A by applying correct gate operations. The quantum operations may include a restoration operation where the receiver 104 uses another qubit 714A to apply an inverse of the quantum operations performed by the transmitter 102 to create the entangled quantum state using Z-axis measurement basis. The receiver 104 then measures the qubits 708A and 714A to obtain two correct classic bits of information.

As shown in a circuit diagram 704A of FIG. 7A, the transmitter 102 prepares two qubits 716A and 718A in an entangled quantum state (a Bell state) using a Hadamard gate and a CNOT operation. Also, the transmitter 102 may prepare a secret qubit with secret bits 726A and entangles the secret qubit down into the qubit 716A using additional quantum operations The transmitter 102 may perform the additional quantum operations using Z-axis measurement basis to the qubit 716A and the secret bits, where the additional operations are based on the classic bits 726A of information that the transmitter 102 wants to share with the receiver 104. Further, the transmitter 102 may perform anti-control encoding 720A of a control operation on one or more of the secret bits 726A. The transmitter 102 transmits the qubit 706A to the receiver 104. For example, the transmitter 102 may then send classical measurement results including the classic bits to the receiver 104. Further, the receiver 104 may receive the classical measurement results and may perform incorrect anti-control decoding operation 722A or place the anti-control decoding operation in a different place to fail the teleportation process and receive corrupted classic bits 724A.

In an example implementation, as shown in a circuit diagram 702B of FIG. 7B, the transmitter 102 prepares two qubits 706B and 708B in an entangled quantum state (a Bell state) using a Hadamard gate and a CNOT operation. Also, the transmitter 102 may prepare a secret qubit with secret bits 728B and entangles the secret qubit down into the qubit 706B using additional quantum operations The transmitter 102 may perform the additional quantum operations using Z-axis measurement basis to the qubit 706B and the secret bits, where the additional operations are based on the classic bits 728B of information that the transmitter 102 wants to share with the receiver 104. Further, the transmitter 102 may perform anti-control encoding 710B of a control operation on one or more of the secret bits 728B using two identical gates. The transmitter 102 transmits the qubit 706B including the classic bits or secret bits to the receiver 104.

The receiver 104 receives the qubit 706B and performs quantum operations to obtain the classic bits of information that the transmitter 102 encoded in the qubit 706B. For example, the receiver 104 may perform anti-control decoding operation 712B based on controlled gates. The quantum operations may include a restoration operation where the receiver 104 uses another qubit 714B to apply an inverse of the quantum operations performed by the transmitter 102 to create the entangled quantum state using Z-axis measurement basis. The receiver 104 then measures the qubits 708B and 714B to obtain the two correct classic bits of information.

In an example implementation, as shown in a circuit diagram 704B of FIG. 7B, the transmitter 102 prepares two qubits 716B and 718B in an entangled quantum state (a Bell state) using a Hadamard gate and a CNOT operation. Also, the transmitter 102 may prepare a secret qubit with secret bits 726B and entangles the secret qubit down into the qubit 716B using additional quantum operations The transmitter 102 may perform the additional quantum operations using Z-axis measurement basis to the qubit 716B and the secret bits 726B, where the additional operations are based on the classic bits of information that the transmitter 102 wants to share with the receiver 104. Further, the transmitter 112 may perform anti-control encoding 720B of a control operation on one or more of the secret bits. The transmitter 102 transmits the qubit 716B including the classic bits or secret bits to the receiver 104.

The receiver 104 receives the qubit 716B and performs quantum operations to obtain the classic bits 726B of information that the transmitter 102 encoded in the qubit 716B. For example, the receiver 104 may perform an anti-control decoding operation 722B by applying Pauli Y-gate based on controlled gates. The quantum operations may include a restoration operation where the receiver 104 uses another qubit 724B to apply an inverse of the quantum operations performed by the transmitter 102 to create the entangled quantum state. The receiver 104 then measures the qubits 718B and 724B to obtain two correct classic bits of information.

Figure 8A:
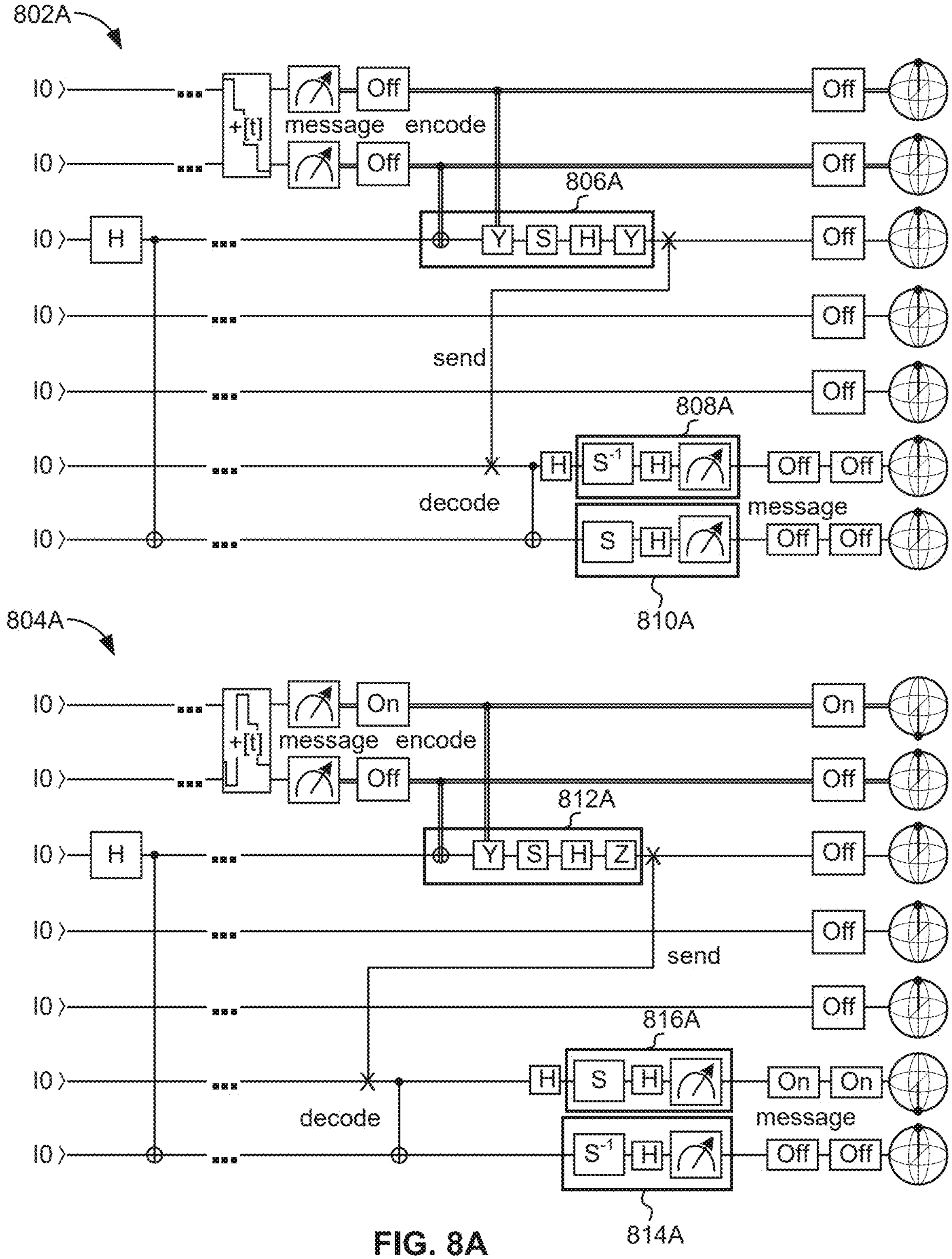
FIGS. 8A-8E depict exemplary quantum superdense coding circuit diagrams with mixed measurements, in accordance with implementations of the present disclosure.

FIGS. 8A-8D depict exemplary quantum superdense coding circuit diagrams 800A-800D with mixed measurements, in accordance with implementations of the present disclosure. In an example implementation, a circuit diagram 802A of FIG. 8A illustrates that the transmitter 102 may measure one of two secret bits in Y-axis measurement basis and another secret bit in −Y-axis measurement basis (i.e., a basis change operation 806A). Further, it is shown in the circuit diagram 802A that the receiver 104 may apply anti-control operations to complete the teleportation using the Y-axis measurement basis and the −Y-axis measurement basis, respectively (i.e., Y-axis measurement basis 808A and −Y-axis measurement basis 810A).

In an example implementation, a circuit diagram 804A of FIG. 8A illustrates that the transmitter 102 may measure one of two secret bits in Y-axis measurement basis and another secret bit in −Y-axis measurement basis (i.e., a basis change operation 812A). Further, it is shown in the circuit diagram 804A that the receiver 104 may apply anti-control operations to complete the teleportation using the Y-axis measurement basis and the −Y-axis measurement basis, respectively (i.e., Y-axis measurement basis 814A and −Y-axis measurement basis 816A).

Figure 8B:
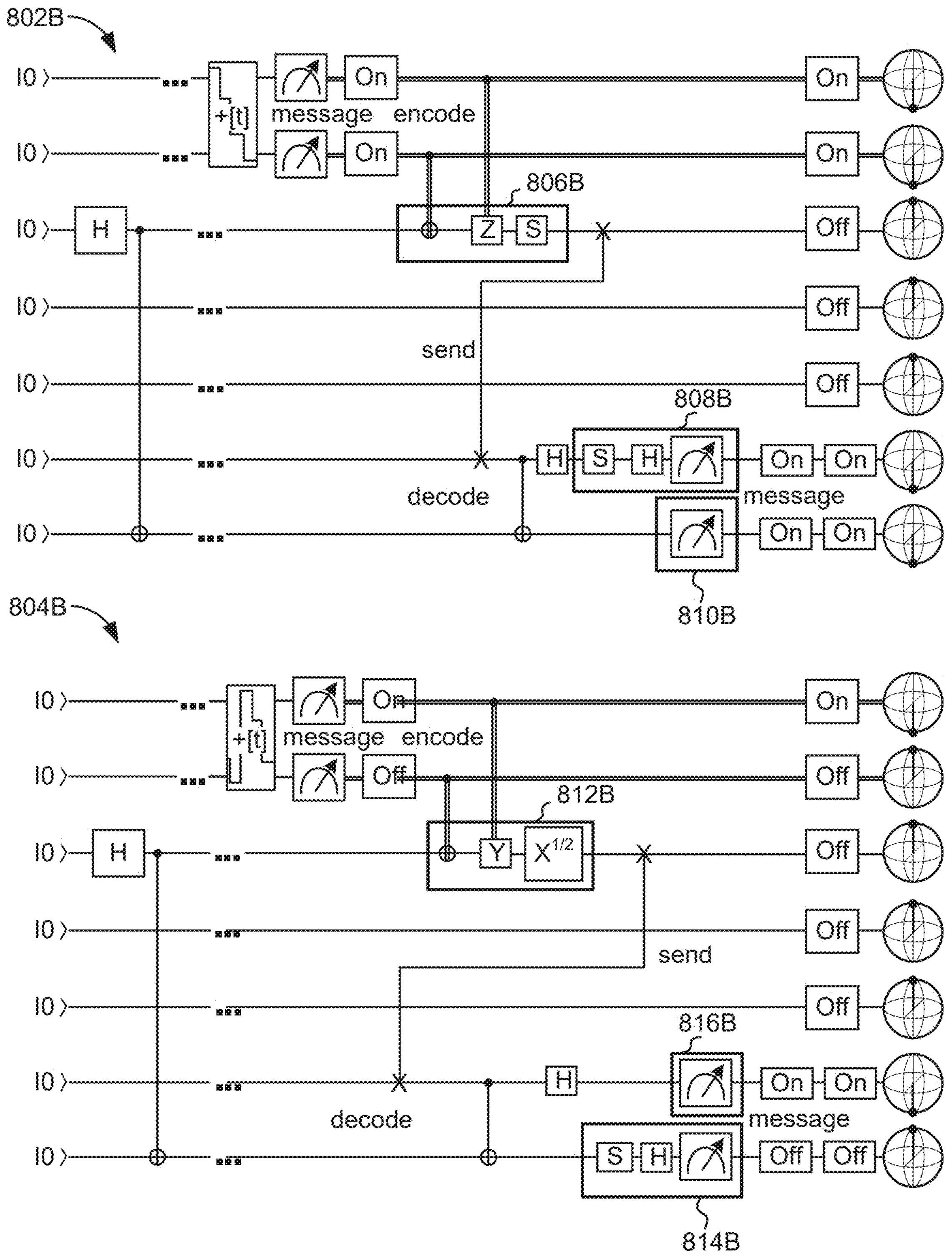

In some examples, a circuit diagram 802B of FIG. 8B illustrates that the transmitter 102 may measure one of two secret bits in −Y-axis measurement basis and another secret bit in Z-axis measurement basis (i.e., a basis change operation 806B). Further, it is shown in the circuit diagram 802B that the receiver 104 may apply anti-control operations to complete the teleportation using the Y-axis measurement basis and the Z-axis measurement basis, respectively (i.e., Y-axis measurement basis 808B and Z-axis measurement basis 810A).

In some examples, a circuit diagram 804B of FIG. 8B illustrates that the transmitter 102 may measure one of two secret bits in Z-axis measurement basis and another secret bit in −Y-axis measurement basis (i.e., a basis change operation 812B). Further, it is shown in the circuit diagram 804B that the receiver 104 may apply anti-control operations to complete the teleportation using the Y-axis measurement basis and the Z-axis measurement basis, respectively (i.e., Y-axis measurement basis 814B and Z-axis measurement basis 816B).

Figure 8C:
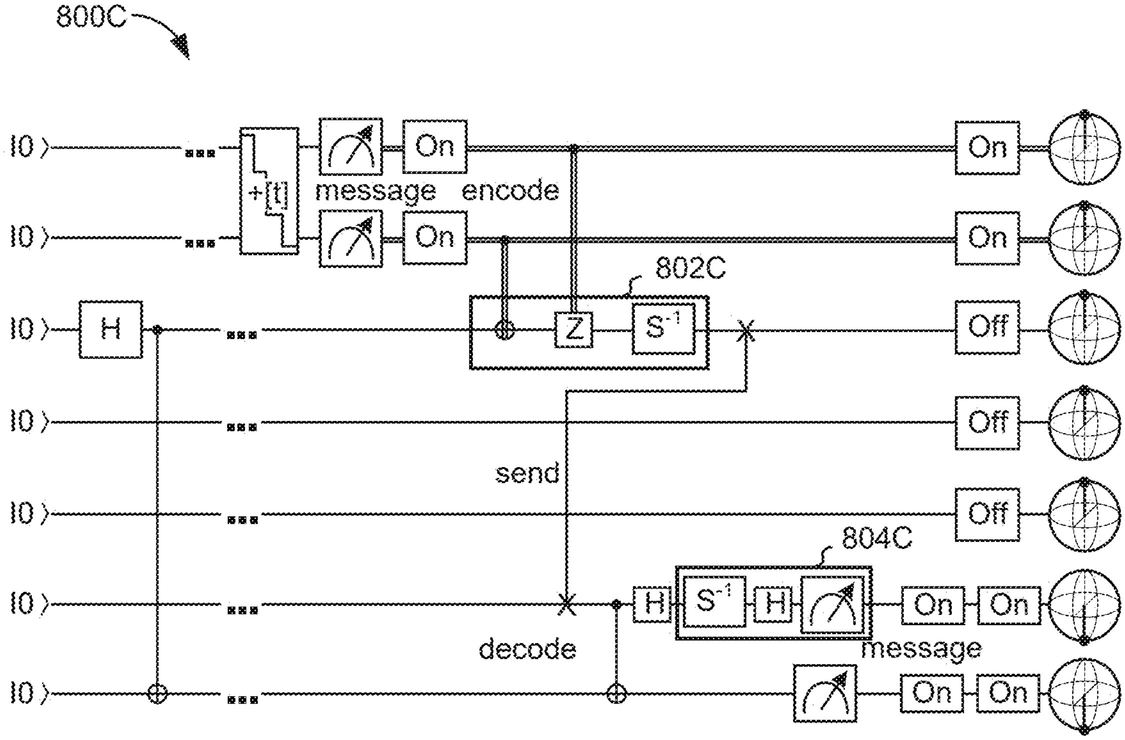

In some examples, a circuit diagram 800C of FIG. 8C illustrates that the transmitter 102 may measure one of two secret bits in Y-axis measurement basis and another secret bit in Z-axis measurement basis (i.e., a basis change operation 802C). Further, it is shown in the circuit diagram 800C that the receiver 104 may apply anti-control operations to complete the teleportation using the Y-axis measurement basis (i.e., Y-axis measurement basis 804C).

Figure 8D:
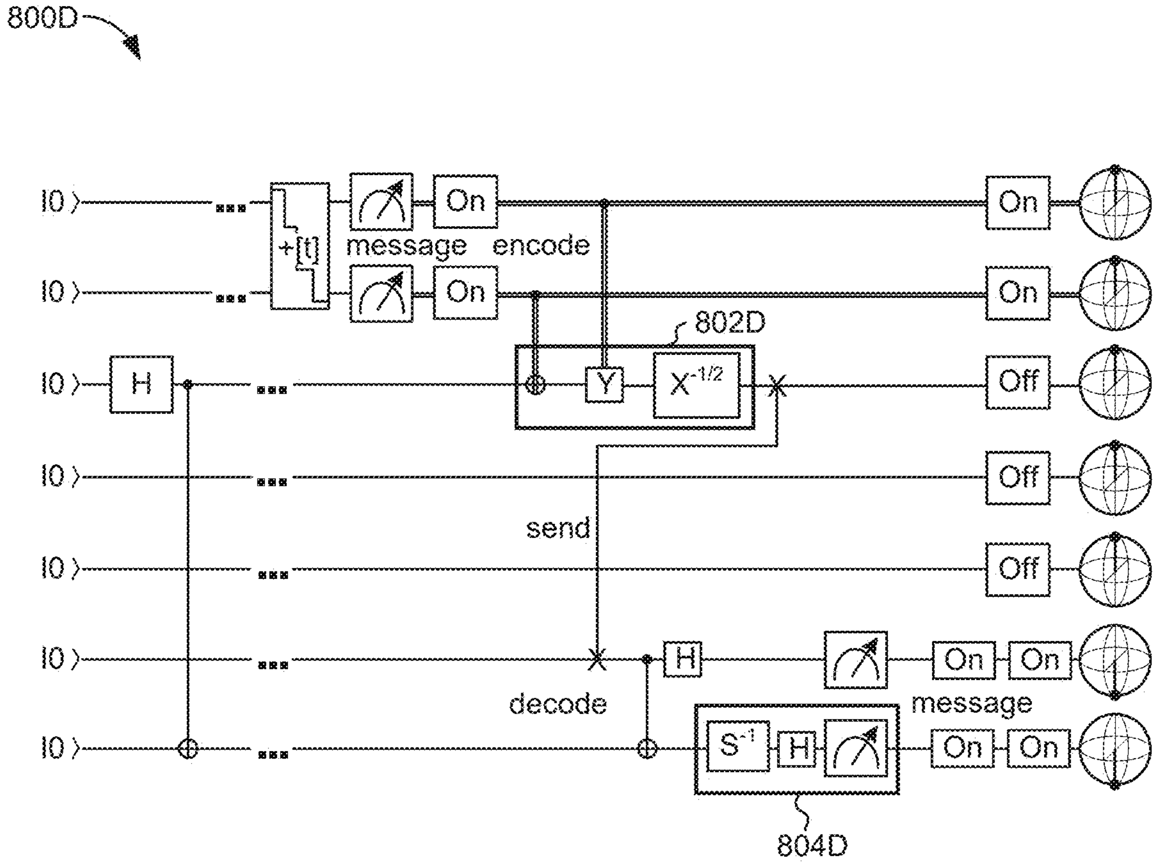

In some examples, a circuit diagram 800D of FIG. 8D illustrates that the transmitter 102 may measure one of two secret bits in Z-axis measurement basis and another secret bit in Y-axis measurement basis (i.e., a basis change operation 802D). Further, it is shown in the circuit diagram 800D that the receiver 104 may apply anti-control operations to complete the teleportation using the Y-axis measurement basis (i.e., Y-axis measurement basis 804D).

Figure 8E:
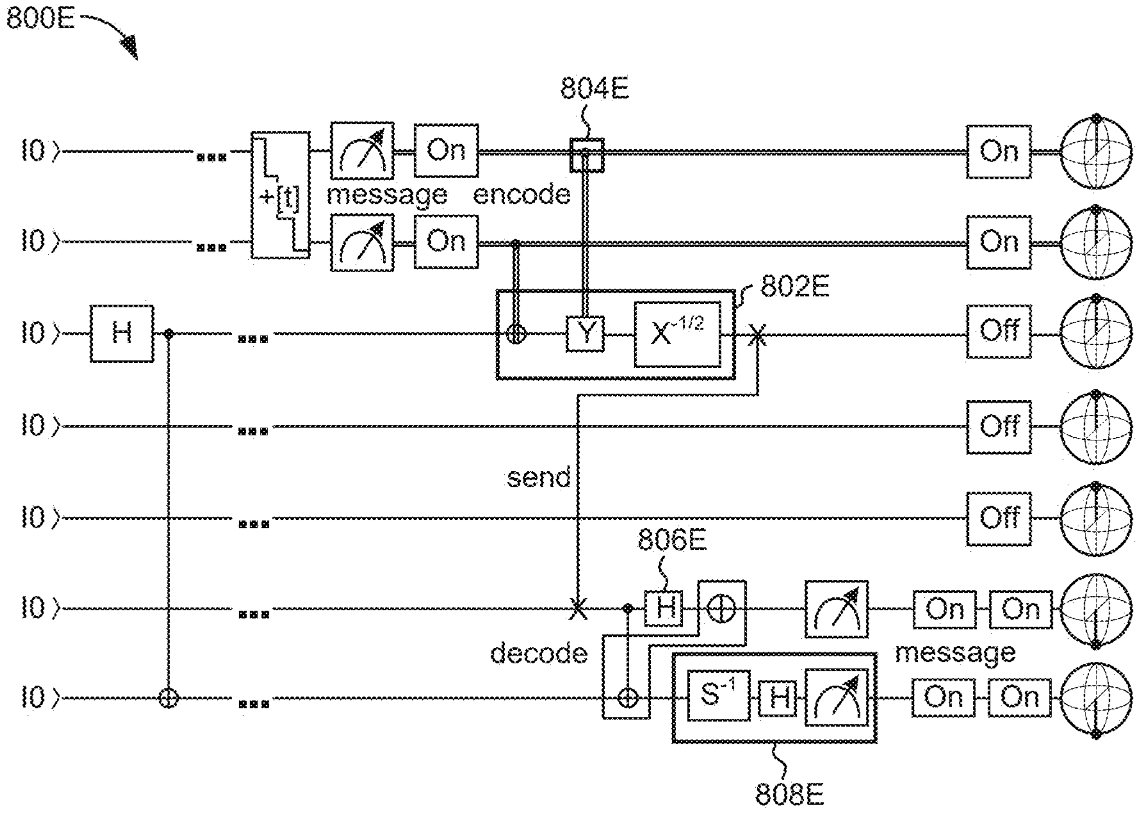

In some examples, a circuit diagram 800E of FIG. 8E illustrates collaboration of anti-control encoding and decoding operations with mixed measurements. For example, as shown in the circuit diagram 800E, the transmitter 102 may measure one of two secret bits in Z-axis measurement basis and another secret bit in Y-axis measurement basis (i.e., a basis change operation 802E). Further, the transmitter 102 may perform an anti-control encoding operation 804E. Furthermore, it is shown in the circuit diagram 800E that the receiver 104 may apply anti-control operations to complete the teleportation using an anti-control decoding operation 806E and the Y-axis measurement basis (i.e., Y-axis measurement basis 808E).

Figure 9A:
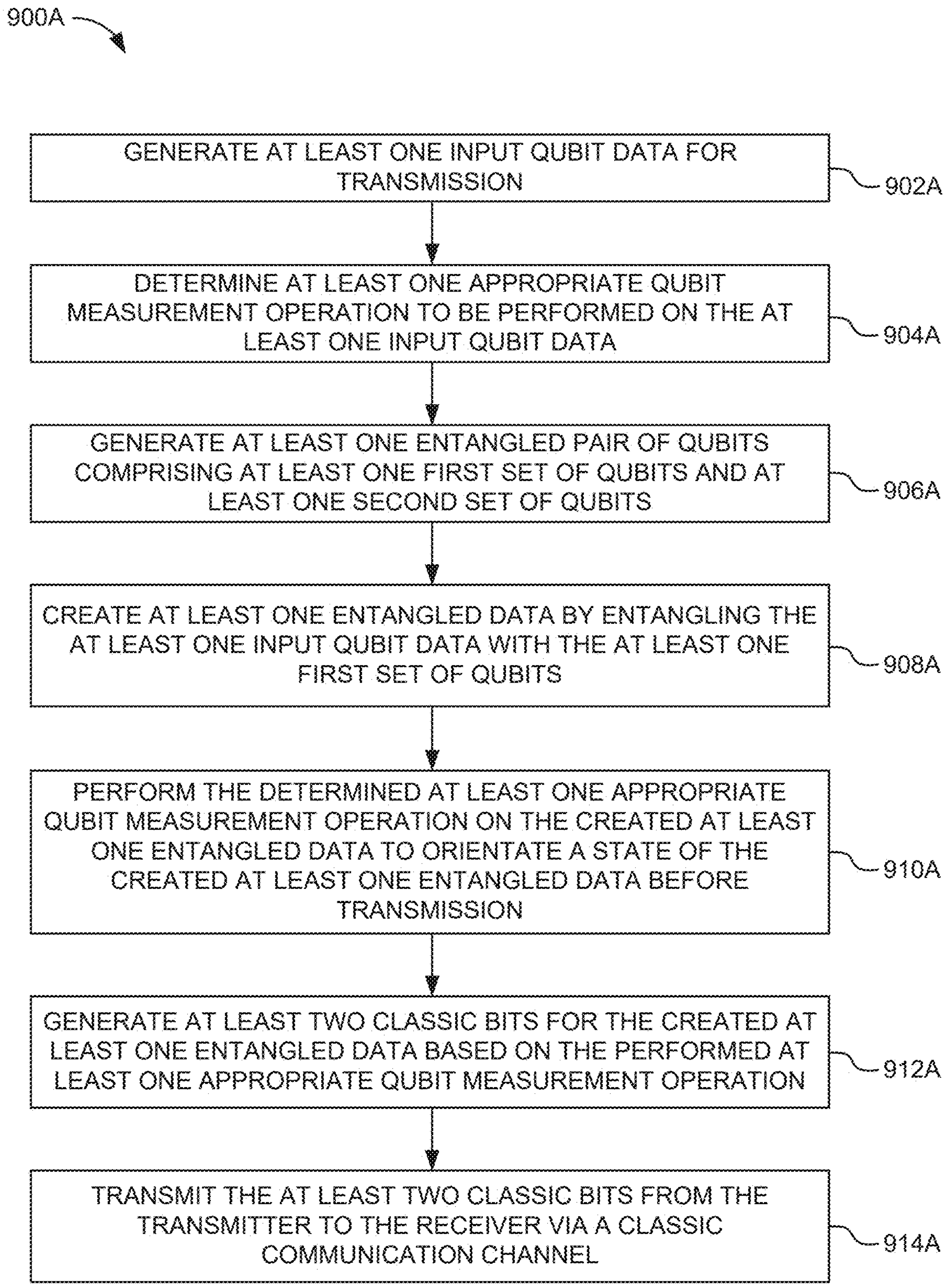
FIGS. 9A and 9B depict flow diagrams that present methods for implementing a multi-axis measurement protocol to protect quantum information, in accordance with implementations of the present disclosure.

FIG. 9A depicts a flow diagram that presents a method 900A performed by the transmitter 102 for a multi-axis measurement protocol to protect quantum information, in accordance with implementations of the present disclosure. At step 902A, the method 900A includes generating, by a processor of the transmitter 102, at least one input qubit data for transmission. For example, the at least one input qubit data includes a state of at least one qubit.

At step 904A, the method 900A includes determining at least one appropriate qubit measurement operation to be performed on the at least one input qubit data. For example, the at least one appropriate qubit measurement operation may include at least one orthogonal axis gate, containing at least one arbitrary measurement operation. In some examples, the determined at least one appropriate qubit measurement operation may include orthogonal axis gates including the at least one arbitrary measurement operation. In these examples, the results of appropriate qubit measurement operation may include at least one of the orthogonal axis gates.

In some examples, for determining the at least one appropriate qubit measurement operation, at least one encoded reference data including the determined at least one appropriate qubit measurement operation and a control gate operation is generated. Further, the generated at least one encoded reference data is transmitted to the receiver through an out of band channel 110 established with the receiver 104.

At step 906A, the method 900A includes generating at least one entangled pair of qubits including at least one first set of qubits and at least one second set of qubits. The at least one first set of qubits may correspond to the transmitter 102 and the at least one second set of qubits corresponds to a receiver 104.

At step 908A, the method 900A includes creating at least one entangled data by entangling the at least one input qubit data with the at least one first set of qubits. In some examples, the method 900A includes encoding the at least one input qubit data using a plurality of encryption techniques upon the creation of the at least one entangled data.

At step 910A, the method 900A includes performing the determined at least one appropriate qubit measurement operation on the created at least one entangled data to orientate a state of the created at least one entangled data before transmission. In some examples, the determined at least one appropriate qubit measurement operation is performed on the created at least one entangled data by determining a first qubit measurement operation to be performed on the at least one input qubit data. The first qubit measurement operation may include a first orthogonal axis gate. For example, the first orthogonal axis gate may include a first angle of rotation, a first axis, and a first global phase value. In some examples, the first orthogonal axis gate may include a Pauli-X gate, Pauli-Y gate, a Pauli-Z gate, a Hadamard gate, a phase (square root of Z) gate, an identity gate, a square root of Y, a square root of Y+, a square root of X, a square root of $X^+$ and the like. Further, a second qubit measurement operation to be performed on the at least one first set of qubits is determined. The second qubit measurement operation may include a second orthogonal axis gate. For example, the second orthogonal axis gate may include a second angle of rotation, a second axis, and a second global phase value. Furthermore, the first qubit measurement operation is performed on the at least one input qubit data and the second qubit measurement operation on the at least one first set of qubits.

In some examples, the method 900A may further include encoding a control gate operation on the created at least one entangled data to generate an inversed state of the created at least one entangled data. Furthermore, the method 900A may include transmitting the encoded control gate operation within the at least one encoded reference data to the receiver through an out of band channel established with the receiver 104.

At step 912A, the method 900A includes generating at least two classic bits for the created at least one entangled data based on the performed at least one appropriate qubit measurement operation.

At step 914A, the method 900A includes transmitting the at least two classic bits from the transmitter to the receiver via a classic communication channel. Also, the method 900A may include transmitting the at least one second set of qubits of the at least one entangled pair of qubits to the receiver.

Figure 9B:
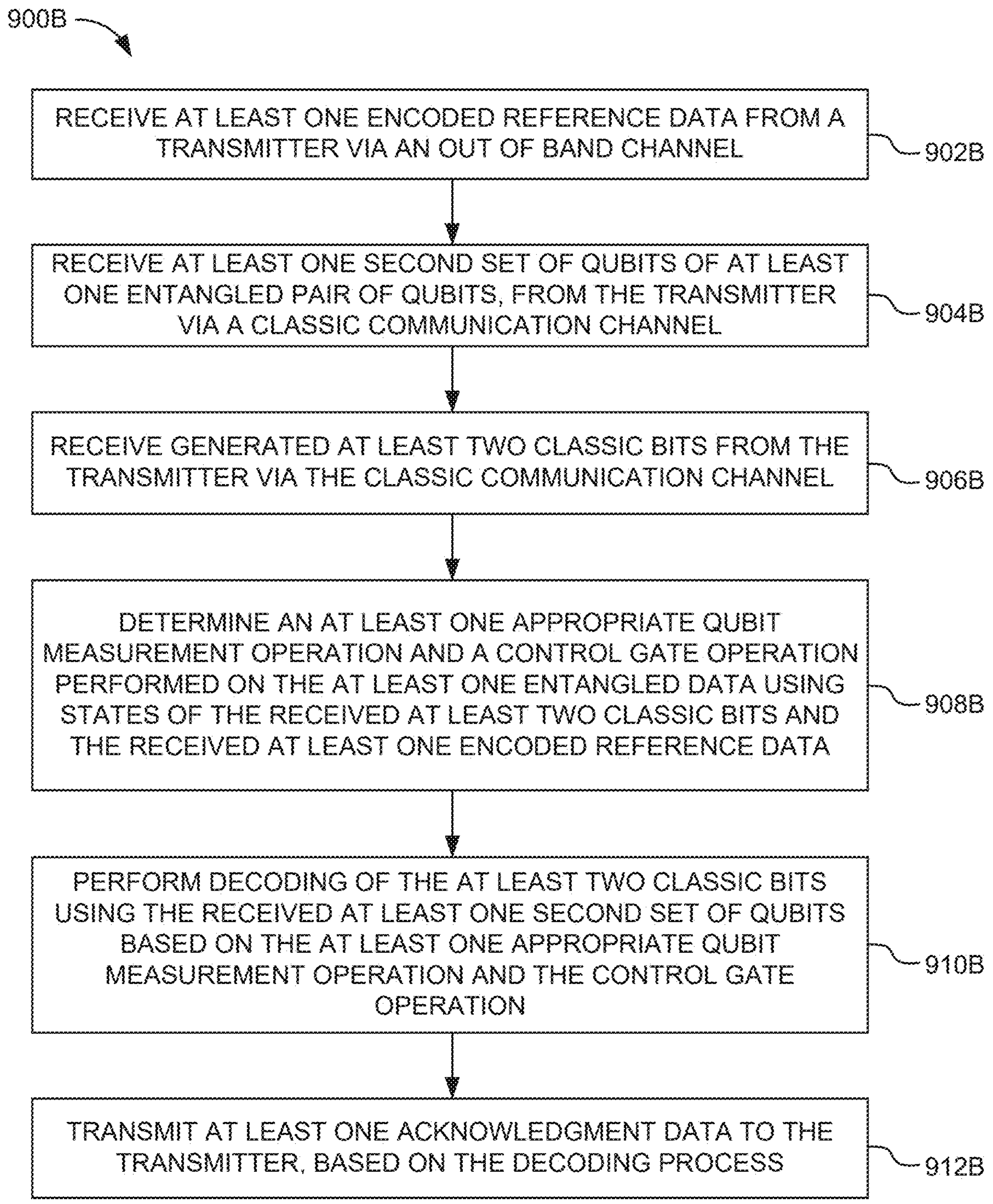

FIG. 9B depicts a flow diagram that presents a method 900B for a multi-axis measurement protocol to protect quantum information, in accordance with implementations of the present disclosure. At step 902B, the method 900B includes receiving, by a processor of the receiver 104, the at least one encoded reference data from the transmitter via the out of band channel. At step 904B, the method 900B includes receiving the at least one second set of qubits of the at least one entangled pair of qubits, from the transmitter via the classic communication channel. At 906B, the method 900B includes receiving the generated at least two classic bits from the transmitter via the classic communication channel. At step 908B, the method 900B includes determining the at least one appropriate qubit measurement operation and the control gate operation performed on the at least one entangled data using states of the received at least two classic bits and the received at least one encoded reference data.

At 910B, the method 900B includes performing decoding of the at least two classic bits using the received at least one second set of qubits based on the at least one appropriate qubit measurement operation and the control gate operation. In some example, for performing the decoding of the at least two classic bits using the received at least one second set of qubits, the at least one appropriate qubit measurement operation and the control gate operation performed on the at least one entangled data are identified, based on the received at least two classic bits and the received at least one encoded reference data. Further, the state of the at least one qubit is determined based on the at least one appropriate qubit measurement operation and the control gate operation performed on the at least one entangled data. Furthermore, the measurement operation is performed on the received at least one entangled data based on the determined state. Moreover, identical control gate operations are performed on the at least one entangled data to obtain original state of the at least one entangled data. Also, the at least one qubit is reconstructed based on the performed measurement operation and the control gate operation.

At 912B, the method 900B includes transmitting at least one acknowledgment data to the transmitter, based on the decoding process. The at least one acknowledgment data may indicate reconstruction of the at least one input qubit data and completion of the decoding process.

Implementations of the present disclosure provide technical solutions to multiple technical problems that arise in the context of protecting quantum information. Implementations of the present disclosure provide diverse basis measurements in hybrid quantum communication, providing a robust defensive mechanism against potential adversaries. The implementation of these measurements enhances unpredictability, thus making the implementation more challenging for an adversary to accurately predict the outcome. Also, the concept of hybrid quantum communication can be further fortified by replacing a standard control logic with an anti-control Logic. Further, the present disclosure is reliable and resolves data loss limitations of existing quantum encryption techniques during qubit measurement.

Also, the technical solution provided by the present disclosure can be used for any quantum algorithm, protocol, memory-storage, communication, or other quantum system which utilizes measurement where it is desirable to protect the information from threats, such as interception, data leakage, information disclosure, confidentiality compromise, privacy invasion, and the like. In addition, the technical solution provided by the present disclosure can leverage Just-In-Time (JIT) security procedure methods to not reveal correct measurement basis until last moment before Measurement. Thus, enabling pseudo-confidential quantum computing. Moreover, the technical solution provided by the present disclosure can be used as a Zero-Knowledge Proof (ZKP) for Quantum where it is proved to get correct classic bits without revealing which measurement basis is selected.

Figure 10:
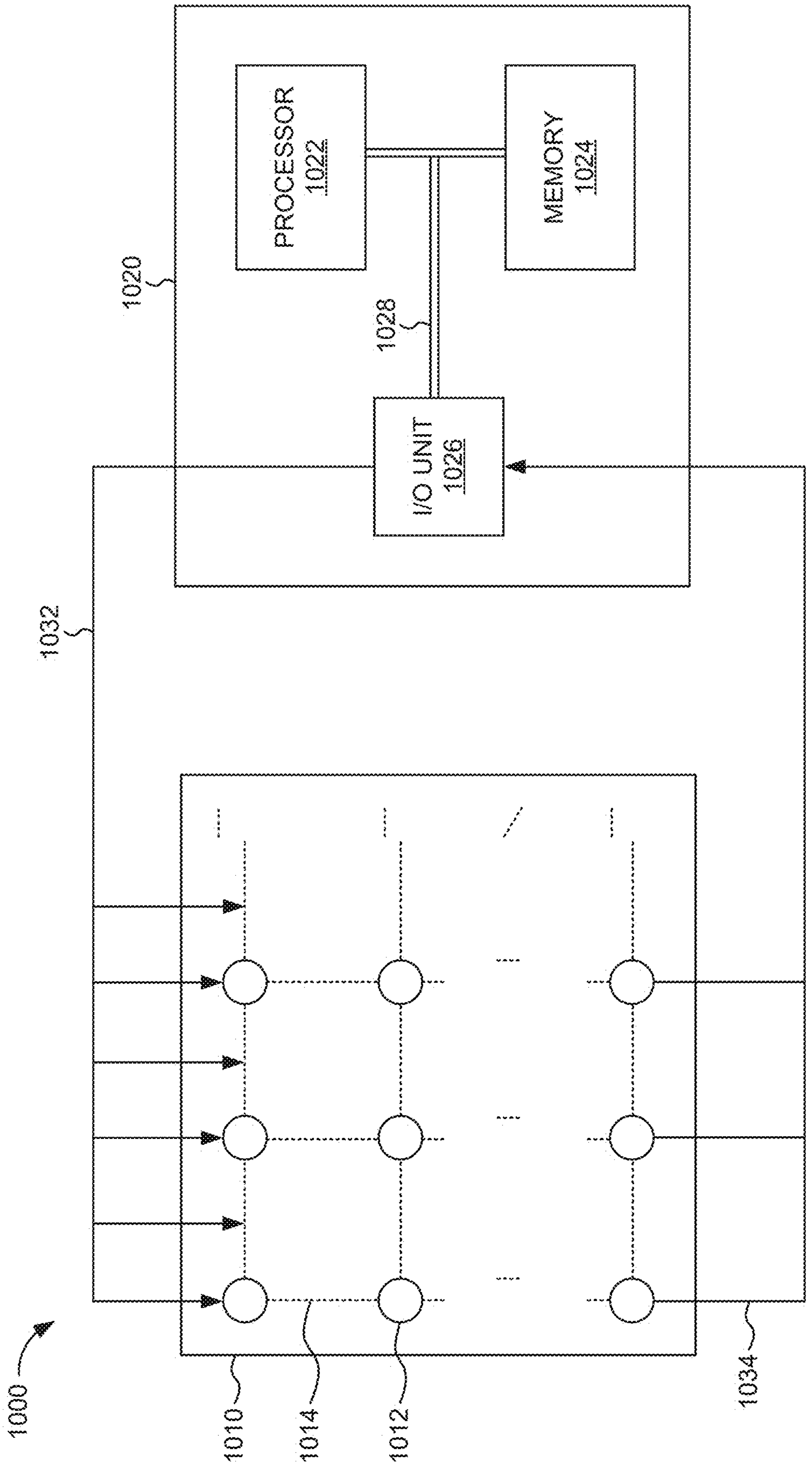
FIG. 10 depicts a block diagram of an example quantum computing device that may be used to carry out the quantum computing methods, in accordance with implementations of the present disclosure.

FIG. 10 depicts a block diagram of an example quantum computing device 1000 (e.g., the quantum computing devices 108A and 108B) that may be used to carry out the quantum computing methods, in accordance with implementations of the present disclosure. The quantum computing device 1000 is intended to represent various forms of quantum computing devices. The components shown here, their connections and relationships, and their functions, are exemplary only, and do not limit implementations of the inventions described and/or claimed in this document.

The quantum computing device 1000 includes a qubit assembly 1010 and a control and measurement system 1020. The qubit assembly includes multiple qubits, e.g., qubits 1012, that are used to perform algorithmic operations or quantum computations. While the qubits shown in FIG. 10 are arranged in a rectangular array, this is a schematic depiction and is not intended to be limiting. The qubit assembly 1010 also includes adjustable coupling elements, e.g., a coupler 1014, that allow for interactions between coupled qubits. In the schematic depiction of FIG. 10, each qubit is adjustably coupled to each of its four adjacent qubits by means of respective coupling elements. However, this is an example arrangement of qubits and couplers, and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 1000 or the type of quantum computations that the quantum computing device 1000 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in an NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), variations of the Pauli gates, e.g., √{square root over (X)}, √{square root over (Z)}, √{square root over (Y)} gates, Hadamard H and S gates, two-qubit gates, e.g., controlled-X, controlled –Y, controlled-Z (also referred to as CX, CY, CZ), CNOT and gates involving three or more qubits, e.g., Toffoli gates. Other gates include alternative Hadamard gates and V gates. The quantum logic gates can be implemented by applying control signals 1032 generated by the control and measurement system 1020 to the qubits and to the couplers.

For example, in some implementations the qubits in the qubit assembly 1010 can be frequency tunable. In these examples, each qubit can have associated operating frequencies that can be adjusted through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 1032 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits using respective control signals 1032. The measurements cause readout signals 1034 representing measurement results to be communicated back to the control and measurement system 920. The readout signals 1034 may include RF, microwave, or optical signals depending on the physical scheme for the quantum computing device 1000 and/or the qubits. For convenience, the control signals 1032 and readout signals 1034 shown in FIG. 10 are depicted as addressing only selected elements of the qubit assembly (i.e. the top and bottom rows), but during operation the control signals 1032 and readout signals 1034 can address each element in the qubit assembly 1010.

The control and measurement system 1020 is an example of a classical computer system that can be used to perform various operations on the qubit assembly 1010, as described above. The control and measurement system 1020 includes one or more classical processors, e.g., a classical processor 1022, one or more memories, e.g., memory 1024, and one or more I/O units, e.g., I/O unit 1026, connected by one or more data buses, e.g., bus 1028. The control and measurement system 1020 can be programmed to send sequences of control signals 1032 to the qubit assembly, e.g. to carry out a selected series of quantum gate operations, and to receive sequences of readout signals 1034 from the qubit assembly, e.g. as part of performing measurement operations.

The processor 1022 is configured to process instructions for execution within the control and measurement system 1020. In some implementations, the processor 1022 is a single-threaded processor. In other implementations, the processor 1022 is a multi-threaded processor. The processor 1022 is capable of processing instructions stored in the memory 1024.

The memory 1024 stores information within the control and measurement system 1020. In some implementations, the memory 1024 includes a computer-readable medium, a volatile memory unit, and/or a non-volatile memory unit. In some cases, the memory 1024 can include storage devices capable of providing mass storage for the system 1020, e.g. a hard disk device, an optical disk device, a storage device that is shared over a network by multiple computing devices (e.g., a cloud storage device), and/or some other large capacity storage device.

The input/output device 1026 provides input/output operations for the control and measurement system 1020. The input/output device 1026 can include D/A converters, A/D converters, and RF/microwave/optical signal generators, transmitters, and receivers, whereby to send control signals 1032 to and receive readout signals 1034 from the qubit assembly, as appropriate for the physical scheme for the quantum computer. In some implementations, the input/output device 1026 can also include one or more network interface devices, e.g., an Ethernet card, a serial communication device, e.g., an RS-232 port, and/or a wireless interface device, e.g., an 902.11 card. In some implementations, the input/output device 1026 can include driver devices configured to receive input data and send output data to other external devices, e.g., keyboard, printer and display devices.

Although an example control and measurement system 1020 has been depicted in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 11:
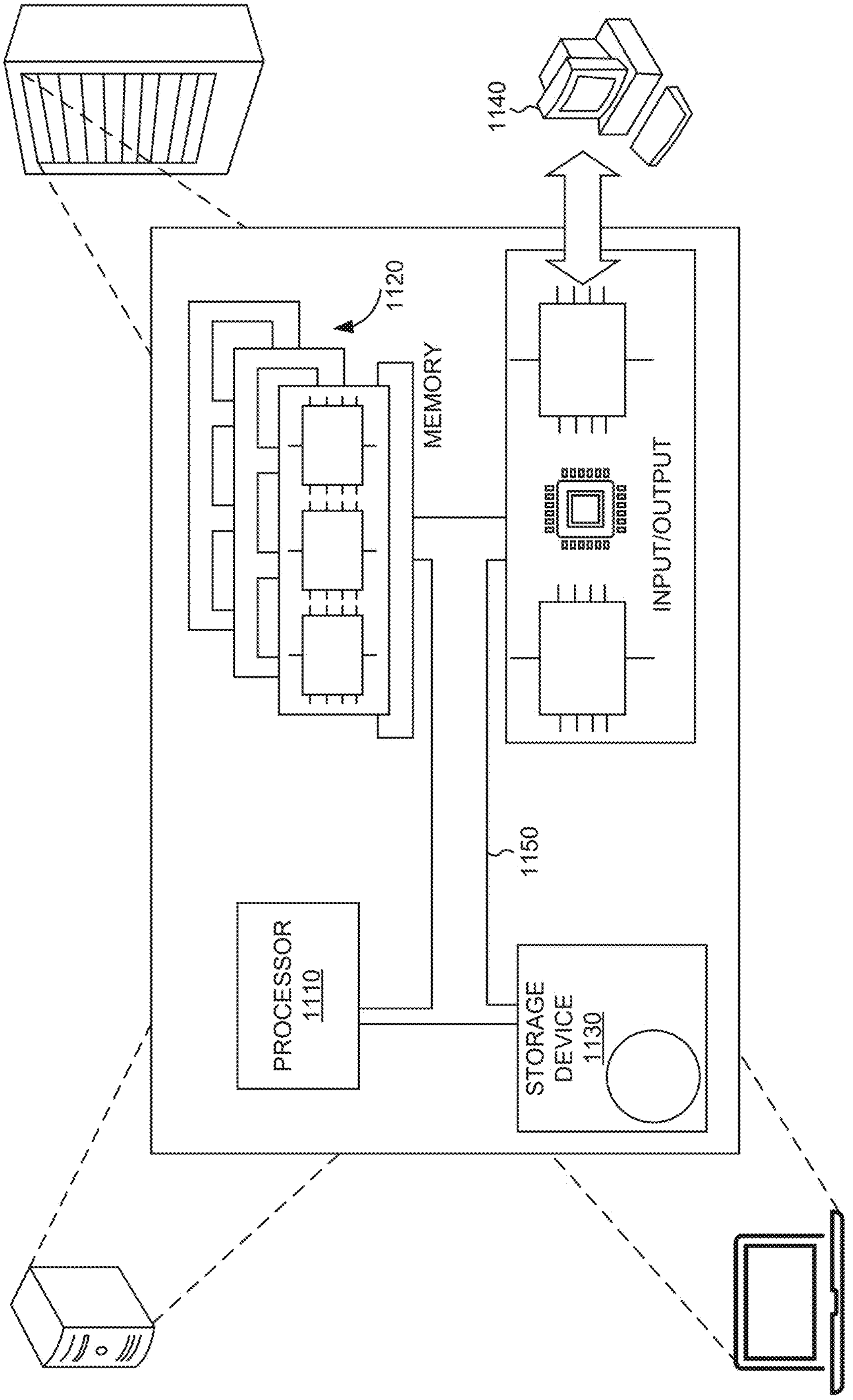
FIG. 11 shows a block diagram of an example classical processor that may be used to carry out classical computing methods, in accordance with implementations of the present disclosure.

FIG. 11 shows an example classical processor 1100 (e.g., the classical processors 106A and 106B) that may be used to carry out classical computing methods, in accordance with implementations of the present disclosure. The system 1100 can be used for the classical operations described in this specification according to some implementations. The system 1100 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1100 includes a processor 1110, a memory 1120, a storage device 1130, and an input/output device 1140. Each of the components 1110, 1120, 1130, and 1140 are interconnected using a system bus 1150. The processor 1110 may be enabled for processing instructions for execution within the system 1100. In one implementation, the processor 1110 is a single-threaded processor. In another implementation, the processor 1110 is a multi-threaded processor. The processor 1110 may be enabled for processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 may be enabled for providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum system devices, quantum system components, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory computer-readable storage medium for execution by, or to control the operation of, data processing apparatus. For example, the computer-readable medium may be non-transitory or non-volatile medium, such as a magnetic disk or solid-state non-volatile memory or volatile medium such as RAM. The instructions or modules stored on the computer-readable medium may include machine-readable instructions executed by the processor that cause the processor(s) to perform the methods 900A and 900B. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random-access memory, or quantum systems suitable for transmitting quantum data, e.g. qubits, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory computer-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification. For example, the computer-readable storage media may be non-transitory or non-volatile medium, such as a magnetic disk or solid-state non-volatile memory or volatile medium such as RAM. The instructions or modules stored on the computer-readable medium may include machine-readable instructions executed by the processor that cause the processor(s) to perform the methods 900A and 900B.

While this specification contains many specifics, these should not be construed as limitations on the scope of the disclosure or of what may be claimed, but rather as descriptions of features specific to implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Several implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:

a transmitter communicatively coupled to a processor, wherein the processor is configured to:

generate at least one input qubit data for transmission, wherein the at least one input qubit data comprises a state of at least one qubit;

determine at least one appropriate qubit measurement operation to be performed on the at least one input qubit data, wherein the at least one appropriate qubit measurement operation comprises at least one orthogonal axis gate, wherein the at least one orthogonal axis gate comprises at least one arbitrary measurement operation;

generate at least one entangled pair of qubits comprising at least one first set of qubits and at least one second set of qubits, wherein the at least one first set of qubits corresponds to the transmitter and the at least one second set of qubits correspond to a receiver;

create at least one entangled data by entangling the at least one in put qubit data with the at least one first set of qubits;

perform the determined at least one appropriate qubit measurement operation on the created at least one entangled data to orientate a state of the created at least one entangled data before transmission;

generate at least two classic bits for the created at least one entangled data based on the performed at least one appropriate qubit measurement operation; and transmit the at least two classic bits from the transmitter to the receiver via a classic communication channel, wherein the transmitter is further configured to perform an anti-control encoding of a control operation on one or more of the at least two classic bits using two identical gates.

2. The system of claim 1, wherein to determine the at least one appropriate qubit measurement operation to be performed on the at least one input qubit data, the processor is further configured to:

generate at least one encoded reference data comprising the determined at least one appropriate qubit measurement operation and a control gate operation; and transmit the generated at least one encoded reference data to the receiver through an out of band channel established with the receiver.

3. The system of claim 1, wherein the processor is further configured to:

transmit the at least one second set of qubits of the at least one entangled pair of qubits to the receiver.

4. The system of claim 1, wherein the processor is further configured to:

encode a control gate operation on the created at least one entangled data to generate an inversed state of the created at least one entangled data; and transmit the encoded control gate operation within at least one encoded reference data to the receiver through an out of band channel established with the receiver.

5. The system of claim 1, wherein the processor is configured to:

encode the at least one input qubit data using a plurality of encryption techniques upon the creation of the at least one entangled data.

6. The system of claim 1, wherein the determined at least one appropriate qubit measurement operation comprises orthogonal axis gates comprising at least one arbitrary measurement basis, wherein results of the at least one appropriate qubit measurement operation on the created at least one entangled data comprises at least one of the orthogonal axis gates.

7. The system of claim 1, wherein to perform the determined at least one appropriate qubit measurement operation on the created at least one entangled data, the processor is configured to:

determine a first qubit measurement operation to be performed on the at least one input qubit data, wherein the first qubit measurement operation comprises a first orthogonal axis gate, wherein the first orthogonal axis gate comprises a first angle of rotation, a first axis, and a first global phase value;

determine a second qubit measurement operation to be performed on the at least one first set of qubits, wherein the second qubit measurement operation comprises a second orthogonal axis gate, wherein the second orthogonal axis gate comprises a second angle of rotation, a second axis, and a second global phase value; and perform the first qubit measurement operation on the at least one input qubit data and the second qubit measurement operation on the at least one first set of qubits.

8. The system of claim 1, further comprising:

the receiver communicatively coupled with the processor, wherein the processor is configured to:

receive the at least one encoded reference data from the transmitter via the out of band channel;

receive the at least one second set of qubits of the at least one entangled pair of qubits, from the transmitter via the classic communication channel;

receive the generated at least two classic bits from the transmitter via the classic communication channel;

determine the at least one appropriate qubit measurement operation and the control gate operation performed on the at least one entangled data using states of the received at least two classic bits and the received at least one encoded reference data;

perform decoding of the at least two classic bits using the received at least one second set of qubits based on the at least one appropriate qubit measurement operation and the control gate operation; and transmit at least one acknowledgment data to the transmitter, based on the decoding process, wherein the at least one acknowledgment data indicates reconstruction of the at least one input qubit data and completion of the decoding process.

9. The system of claim 8, wherein to perform the decoding of the at least two classic bits using the received at least one second set of qubits, the processor is configured to:

identify the at least one appropriate qubit measurement operation and the control gate operation performed on the at least one entangled data, based on the received at least two classic bits and the received at least one encoded reference data;

determine the state of the at least one qubit based on the at least one appropriate qubit measurement operation and the control gate operation performed on the at least one entangled data;

perform the measurement operation on the received at least one entangled data based on the determined state;

perform identical control gate operations on the at least one entangled data to obtain original state of the at least one entangled data; and reconstruct the at least one qubit based on the performed measurement operation and the control gate operations.

10. A method comprising:

generating, by a processor of a transmitter, at least one input qubit data for transmission, wherein the at least one input qubit data comprises a state of at least one qubit;

determining, by the processor of the transmitter, at least one appropriate qubit measurement operation to be performed on the at least one input qubit data, wherein the at least one appropriate qubit measurement operation comprises at least one orthogonal axis gate, wherein the at least one orthogonal axis gate comprises at least one arbitrary measurement operation;

generating, by the processor of the transmitter, at least one entangled pair of qubits comprising at least one first set of qubits and at least one second set of qubits, wherein the at least one first set of qubits corresponds to the transmitter and the at least one second set of qubits corresponds to a receiver;

creating, by the processor of the transmitter, at least one entangled data by entangling the at least one input qubit data with the at least one first set of qubits;

performing, by the processor of the transmitter, the determined at least one appropriate qubit measurement operation on the created at least one entangled data to orientate a state of the created at least one entangled data before transmission;

generating, by the processor of the transmitter, at least two classic bits for the created at least one entangled data based on the performed at least one appropriate qubit measurement operation; and transmitting, by the processor of the transmitter, the at least two classic bits from the transmitter to the receiver via a classic communication channel, wherein the processor of the transmitter is further configured to perform an anti-control encoding of a control operation on one or more of the at least two classic bits using two identical gates.

11. The method of claim 10, wherein determining the at least one appropriate qubit measurement operation to be performed on the at least one input qubit data, comprises:

generating, by the processor of the transmitter, at least one encoded reference data comprising the determined at least one appropriate qubit measurement operation and a control gate operation; and transmitting, by the processor of the transmitter, the generated at least one encoded reference data to the receiver through an out of band channel established with the receiver.

12. The method of claim 10, further comprising:

transmitting, by the processor of the transmitter, the at least one second set of qubits of the at least one entangled pair of qubits to the receiver.

13. The method of claim 10, further comprising:

encoding, by the processor of the transmitter, a control gate operation on the created at least one entangled data to generate an inversed state of the created at least one entangled data; and transmitting, by the processor of the transmitter, the encoded control gate operation within the at least one encoded reference data to the receiver through an out of band channel established with the receiver.

14. The method of claim 10, further comprising:

encoding, by the processor of the transmitter, the at least one input qubit data using a plurality of encryption techniques upon the creation of the at least one entangled data.

15. The method of claim 10, wherein the determined at least one appropriate qubit measurement operation comprises orthogonal axis gates comprising at least one arbitrary measurement operation, wherein the results of appropriate qubit measurement operation comprise at least one of the orthogonal axis gates.

16. The method of claim 10, wherein performing the determined at least one appropriate qubit measurement operation on the created at least one entangled data comprises:

determining, by the processor of the transmitter, a first qubit measurement operation to be performed on the at least one input qubit data, wherein the first qubit measurement operation comprises a first orthogonal axis gate, wherein the first orthogonal axis gate comprises a first angle of rotation, a first axis, and a first global phase value;

determining, by the processor of the transmitter, a second qubit measurement operation to be performed on the at least one first set of qubits, wherein the second qubit measurement operation comprises a second orthogonal axis gate, wherein the second orthogonal axis gate comprises a second angle of rotation, a second axis, and a second global phase value; and performing, by the processor of the transmitter, the first qubit measurement operation on the at least one input qubit data and the second qubit measurement operation on the at least one first set of qubits.

17. The method of claim 10, further comprising:

receiving, by a processor of the receiver, the at least one encoded reference data from the transmitter via the out of band channel;

receiving, by the processor of the receiver, the at least one second set of qubits of the at least one entangled pair of qubits, from the transmitter via the classic communication channel;

receiving, by the processor of the receiver, the generated at least two classic bits from the transmitter via the classic communication channel;

determining, by the processor of the receiver, the at least one appropriate qubit measurement operation and the control gate operation performed on the at least one entangled data using states of the received at least two classic bits and the received at least one encoded reference data;

performing, by the processor of the receiver, decoding of the at least two classic bits using the received at least one second set of qubits based on the at least one appropriate qubit measurement operation and the control gate operation; and transmitting, by the processor of the receiver, at least one acknowledgment data to the transmitter, based on the decoding process, wherein the at least one acknowledgment data indicates reconstruction of the at least one input qubit data and completion of the decoding process.

18. The method of claim 17, wherein performing the decoding of the at least two classic bits using the received at least one second set of qubits, comprises:

identifying, by the processor of the receiver, the at least one appropriate qubit measurement operation and the control gate operation performed on the at least one entangled data, based on the received at least two classic bits and the received at least one encoded reference data;

determining, by the processor of the receiver, the state of the at least one qubit based on the at least one appropriate qubit measurement operation and the control gate operation performed on the at least one entangled data;

performing, by the processor of the receiver, the measurement operation on the received at least one entangled data based on the determined state;

performing, by the processor of the receiver, identical control gate operations on the at least one entangled data to obtain original state of the at least one entangled data; and reconstructing, by the processor of the receiver, the at least one qubit based on the performed measurement operation and the control gate operation.

19. A non-transitory computer readable medium storing a processor-executable instructions that cause a processor to:

generate at least one input qubit data for transmission, wherein the at least one input qubit data comprises a state of at least one qubit;

determine at least one appropriate qubit measurement operation to be performed on the at least one input qubit data, wherein the at least one appropriate qubit measurement operation comprises at least one orthogonal axis gate, wherein the at least one orthogonal axis gate comprises at least one arbitrary measurement operation;

generate at least one entangled pair of qubits comprising at least one first set of qubits and at least one second set of qubits, wherein the at least one first set of qubits corresponds to a transmitter and the at least one second set of qubits correspond to a receiver;

create at least one entangled data by entangling the at least one input qubit data with the at least one first set of qubits;

perform the determined at least one appropriate qubit measurement operation on the created at least one entangled data to orientate a state of the created at least one entangled data before transmission;

generate at least two classic bits for the created at least one entangled data based on the performed at least one appropriate qubit measurement operation; and transmit the at least two classic bits from the transmitter to the receiver via a classic communication channel, wherein the processor is further caused to perform an anti-control encoding of a control operation on one or more of the at least two classic bits using two identical gates.

20. The non-transitory computer readable medium of claim 19, wherein to determine the at least one appropriate qubit measurement operation to be performed on the at least one input qubit data, the processor-executable instructions cause the processor to:

generate at least one encoded reference data comprising the determined at least one appropriate qubit measurement operation and a control gate operation; and transmit the generated at least one encoded reference data to the receiver through an out of band channel established with the receiver.

* * * * *